US012561641B2

(12) United States Patent
Walser et al.

(10) Patent No.: US 12,561,641 B2
(45) Date of Patent: Feb. 24, 2026

(54) CASH LEVEL OPTIMIZATION WITH AUTOCALIBRATION

(71) Applicant: Sesami Cash Management Software GmbH, Munich (DE)

(72) Inventors: Joachim Paul Walser, Munich (DE); Clemens Sickinger, Munich (DE); Karsten Bohlen, Munich (DE)

(73) Assignee: SESAMI CASH MANAGEMENT SOFTWARE GMBH, Munich (DE)

( * ) Notice: Subject to any disclaimer, the term of this patent is extended or adjusted under 35 U.S.C. 154(b) by 491 days.

(21) Appl. No.: 17/300,514

(22) Filed: Jul. 27, 2021

(65) Prior Publication Data

US 2022/0036293 A1 Feb. 3, 2022

(30) Foreign Application Priority Data

Jul. 28, 2020 (EP) ..................................... 20188070

(51) Int. Cl.
| | |
|---|---|
| *G06Q 10/087* | (2023.01) |
| *G06N 3/126* | (2023.01) |
| *G06N 5/01* | (2023.01) |

(52) U.S. Cl.
CPC ........... *G06Q 10/087* (2013.01); *G06N 3/126* (2013.01); *G06N 5/01* (2023.01)

(58) Field of Classification Search
CPC ........... G06Q 10/087; G06Q 10/06315; G06Q 20/1085; G06N 3/126; G06N 5/01; G06N 3/086; G07F 19/209; G07F 19/206
See application file for complete search history.

(56) References Cited

U.S. PATENT DOCUMENTS

| | | | | |
|---|---|---|---|---|
| 2015/0178670 A1* | 6/2015 | Angus | .................... | G06Q 20/18 |
| | | | | 705/28 |
| 2017/0308835 A1* | 10/2017 | Diao | .................. | G06Q 20/1085 |
| 2019/0180186 A1* | 6/2019 | Liang | .................... | G06N 3/048 |

FOREIGN PATENT DOCUMENTS

CN        110415462 A        11/2019

OTHER PUBLICATIONS

Armenise, Roberto, et al. "Optimizing ATM cash management by genetic algorithms." International Journal of Computer Information Systems and Industrial Management Applications 4 (2012): 598-608. Available at: http://mirlabs.org/ijcisim/regular_papers_2012/Paper66.pdf, Accessed Sep. 29, 2023. (Year: 2012).*

(Continued)

*Primary Examiner* — Florian M Zeender
*Assistant Examiner* — Kimberly S. Bursum
(74) *Attorney, Agent, or Firm* — David W. Carstens; James H. Ortega; Carstens, Allen & Gourley, LLP

(57) ABSTRACT

The disclosure concerns a computer-implemented method of optimizing the cash level of a cash device (20), wherein the cash level indicates an amount of currency in at least one cash box of the cash device (20), wherein the method comprises the following steps: iteratively optimizing, in an automated manner, a calibration (26) of the cash device (20), wherein the calibration (26) comprises a plurality of parameters; and generating a plan (29) based at least in part on the calibration (26), wherein the plan (29) indicates when and/or how the cash device (20) is to be serviced.

12 Claims, 13 Drawing Sheets

(56) References Cited

OTHER PUBLICATIONS

Ghodrati, Ahmadreza, Hassan Abyak, and Abdorreza Sharifihosseini. "ATM cash management using genetic algorithm." Management Science Letters 3.7 (2013): 2007-2041. Available at: http://growingscience.com/beta/msl/989-atm-cash-management-using-genetic-algorithm.html Accessed Sep. 29, 2023 (Year: 2013).*

Poorzaker Arabani, Soodabeh, and Hosein Ebrahimpour Komleh. "The improvement of forecasting ATMS cash demand of Iran banking network using convolutional neural network." Arabian Journal for Science and Engineering 44 (2019): 3733-3743. Avail: https://link.springer.com/article/10.1007/s13369-018-3647-7 (Year: 2019).*

Balakrishnan, T. V., and R. Kalaiarasi. "A Literature Survey on Automated Teller Machine Cash Demand Analysis and Prediction in Financial Sector." Ilkogretim Online 20.6 (2021): 2146-2161. Avail: https://www.researchgate.net/profile/R-Kalaiarasi-2/publication/364947240_A_Literature_Survey_On_Automa (Year: 2021).*

Choo Jun Tan, Chee Peng Lim, Yu-N Cheah, A multi-objective evolutionary algorithm-based ensemble optimizer for feature selection and classification with neural network models, Neurocomputing, vol. 125, 2014, pp. 217-228, ISSN 0925-2312, https://doi.org/10.1016/j.neucom.2012.12.057. (Year: 2008).*

Cuadra, Lucas, et al. "Reducing the computational cost for sound classification in hearing aids by selecting features via genetic algorithms with restricted search." 2008 International Conference on Audio, Language and Image Processing. IEEE, 2008. (Year: 2008).*

Kwon J-H, Kim E-J. Failure Prediction Model Using Iterative Feature Selection for Industrial Internet of Things. Symmetry. 2020; 12(3):454. https://doi.org/10.3390/sym12030454 (Year: 2020).*

Raymer, Michael L., et al. "Dimensionality reduction using genetic algorithms." IEEE transactions on evolutionary computation 4.2 (2000): 164-171. Avail at: https://scholar.google.com/scholar?hl=en&as_sdt=0%2C47&q=raymer+dimensionality+reduction&oq=raymer+dimensionality (Year: 2020).*

Armenise,Roberto,et al."OptimizingATMcashmanagementbygeneticalgorithms." InternationalJournalofComputerInformationSystemsandIndustrialManagementApplications4(2012):598-608.Availableat:http://mirlabs.org/ijcisim/regular_papers_2012/Paper66.pdf, AccessedSep. 29, 2023. (Year:2012) (Year: 2012).*

Extended European Search Report of European Application No. 20188070.5.

Extended European Search Report of European Application No. 20188070.5, dated Feb. 1, 2021.

* cited by examiner planfocus software GmbH

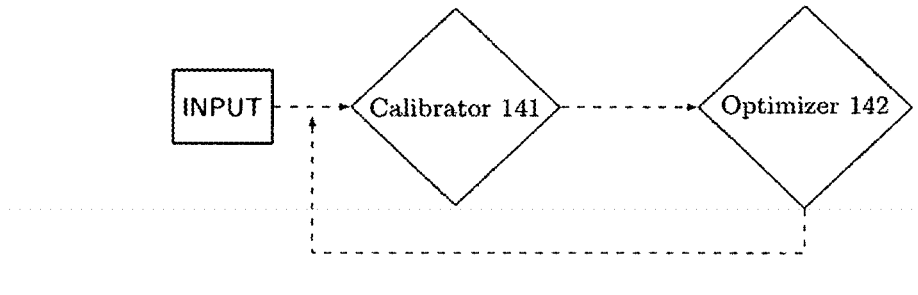
Fig. 14 (Feedback loop)

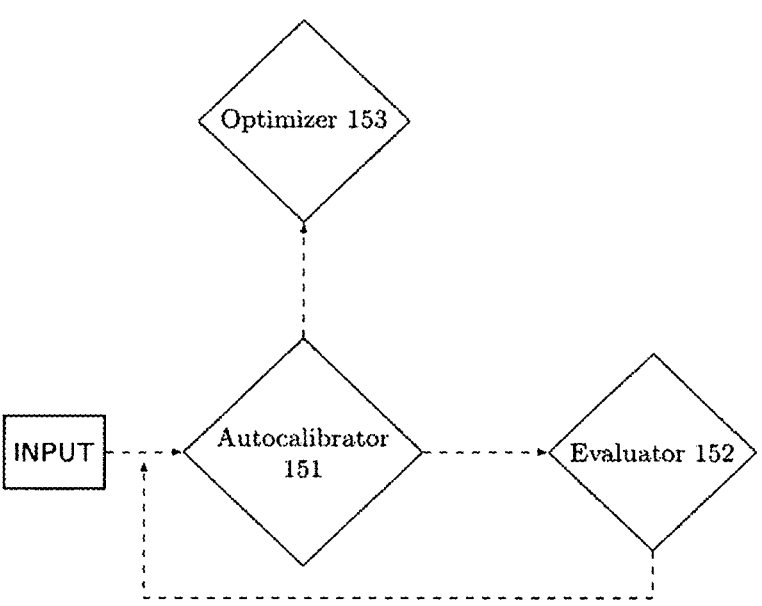
Fig. 15 (Feedback loop)

CASH LEVEL OPTIMIZATION WITH AUTOCALIBRATION

CROSS-REFERENCE TO RELATED APPLICATIONS

This application is a continuation-in-part of EP Application No. 20188070, filed Jul. 28, 2020, the disclosure of which is incorporated herein by reference.

BACKGROUND

Technical Field

The present disclosure generally relates to the optimization of the amount of cash money maintained in cash devices, in particular cash-dispensing and cash-recycling devices such as ATMs, and more specifically to methods for auto-calibrating such optimizations.

Description of Related Art

Cashpoints, such as Automatic-Teller-Machines ("ATMs") or other devices that can dispense and/or accept cash money (broadly referred to as "cash devices" herein), need to be stocked with a sufficient amount of cash, typically in the form of banknotes or coins, to operate properly. On the other hand, equipping a cashpoint with more cash than needed not only bears a severe security risk, but is also not optimal from an economic perspective. Therefore, it is important to optimize the cash level of a cashpoint, i.e. the amount of cash present in the cashpoint, and the exact time points when cash replenishment services ("services") take place, ideally for the entire network of supply and demand that forms the cash supply chain, or cash cycle.

However, cash level optimization is a complex and difficult task. One reason is that a cash supply chain is typically subject to a large number of parameters, which need to be correctly adjusted within context-dependent varying ranges to fine tune the optimization. Correctly adjusting the parameters is important to meet the business objectives and operate under the given operational conditions and constraints relevant for the cash supply chain, such as interest rates, or insurance limits. Some of the parameters also take into account specific properties of individual cashpoints, such as the average frequency and size with which withdrawals and deposits take place, as well as their breakdown in terms of denominations of a currency. These and other parameters need to be properly optimized in view of a tradeoff between objectives. In particular, both the amount of the services (e.g. replenishments of cash) and the inventory costs (e.g. interest or opportunity costs of holding cash) should be minimized at the same time. Apart from these objectives, optimizing the cash level of a given cashpoint is particularly important from a technical point of view, because the cashpoint will apparently not be usable when it runs out of cash. This way, cash level optimization ensures the continued operability of the cashpoint.

BRIEF SUMMARY

This problem is according to one aspect of the disclosure solved by a system, method and/or techniques for optimizing the cash level of a cash device and/or for optimizing the efficiency of cash flow. The cash level may indicate an amount of currency, such as banknotes, in at least one cash box of the cash device. The system may comprise steps such as iteratively optimizing, in an automated manner, a calibration of the cash device, wherein the calibration comprises a plurality of parameters, and generating a plan based at least in part on the calibration. The plan may indicate when and/or how the cash device is to be serviced.

Accordingly, the method provides an optimized calibration for the cash device in an automated manner. Unlike in the prior art, the method does not involve a calibration by a human agent, which is error-prone, slow and may lead to suboptimal calibrations. This way, when the cash device is serviced according to the optimized plan, proper operation and technical functioning of the cash device is ensured. In particular, downtimes of the cash device are effectively avoided, i.e. times when the cash device is out of cash, due to the optimized equipping of the device with cash according to the optimized plan.

The step of iteratively optimizing a calibration may comprise generating the calibration of the cash device based at least in part on a forecast of expected transactions, a cash level history and/or a current cash level of the cash device. The forecast may be generated using a mathematical model based at least in part on the cash level history of the cash device. The cash level history may be based on one or more current cash level measurements (current at the time of measurement) received either directly from the cash-dispensing device or via a server. This way, the method takes into account the actual real-life status of the cash-dispensing device and can generate a particularly suitable calibration.

In one aspect of the present disclosure, the plurality of parameters comprises one or more of the following parameters: a parameter defining one or more denominations; a parameter defining a stock level threshold, preferably for each of the one or more denominations; a parameter defining a buffer factor; a parameter defining a minimum balance for at least one denomination; a parameter defining a maximum service interval for the cash device.

In another aspect, the step of iteratively optimizing a calibration may comprise grouping the parameters into one or more categories, preferably such that functional relationships between the parameters in a given category are preserved. This aspect considerably improves the performance of the optimization process, as will be further explained in the detailed description further below.

In addition, or alternatively, the step of iteratively optimizing a calibration may comprise calculating values of the parameters using a genetic algorithm and/or an evolutionary metaheuristic.

In yet another aspect, the step of iteratively optimizing a calibration may comprise storing one or more values of the parameters in a neural network, preferably a feedforward neural network. Such a neural network may serve as a memory for optimal calibrations, which can later be reused to save resources.

The method may also comprise the further step of evaluating the quality of the calibration. The evaluator may comprise an engine implementing the core functionalities required for the evaluation of a given candidate calibration dataset and/or a system that can be interconnected over a network with other computing devices and/or other devices, depending on the specifics of a particular embodiment. The evaluating may comprise three types of evaluation that are weighted relative to their importance, comprising a service level evaluator, a service trigger evaluator and a cost evaluator.

The method may comprise an optimizer that generates a plan based on the calibration and a time period in the past, and, comparing the plan to a cash level history of the cash device during the time period.

The plan may be transmitted over a network to an automated cash center, the automated cash center comprising means for automatically equipping one or more cash boxes, i.e. bank note containers, for the cash device with bank notes in accordance with the plan. This way, a fully automated closed-loop solution is provided in which the cash boxes destined for the cash device are automatically equipped with their optimal amount of cash. The only task remaining for the service personnel is then to exchange the cash device's cash boxes with the automatically equipped ones, so that the cash levels are optimized, also on a physical level, in a fully automated manner without any significant human intervention.

Furthermore, the step of iteratively optimizing a calibration may comprise randomly generating one or more sets of values for the parameters, the sets of values meeting one or more constraints, and repeatedly processing the sets of values by a genetic algorithm until a termination criterion is met. The genetic algorithm may perform mutation, combination and selection operations. The selection operation preferably comprises a ranking of the sets of values, wherein the ranking may take into account factors involving the following criteria: maximized service level including high probability to trigger a replenishment at the right point in time, high probability to determine an appropriate amount for the intended range, minimized total costs e.g. processing costs, interest costs, stock costs and/or penalty costs as well as the period of validity.

Any of the above-described methods may be performed by a server remote from the cash device or by a distributed computing system. This way, a given cash device (and in fact many cash devices) can be managed remotely in an efficient manner.

Alternatively, the methods may be performed locally on the cash device itself. This way, the cash device measures its current cash levels and autonomously optimizes its cash levels based on the measurements. The optimized plan can then be transmitted to an automated cash center, as already explained above.

The present disclosure also concerns a computer program comprising instructions for implementing any of the methods disclosed herein. Lastly, a system for optimizing the cash level of a cash device is provided, wherein the system is configured for performing any of the methods disclosed herein.

BRIEF DESCRIPTION OF THE DRAWINGS

The novel features believed characteristic of the disclosure are set forth in the appended claims. The disclosure itself, however, as well as a preferred mode of use, further objectives and advantages thereof, will be best understood by reference to the following detailed description of illustrative embodiments when read in conjunction with the accompanying drawings, wherein:

In the following detailed description, presently preferred embodiments of the invention are further described with reference to the following figures.

4 and optimizer engine. After creation of auto calibrated parameters, the system creates a plan for optimal cash level adjustments. Via a secure network, this information is passed on to the cashpoint, closing the fully automated circle.

Figure 3:
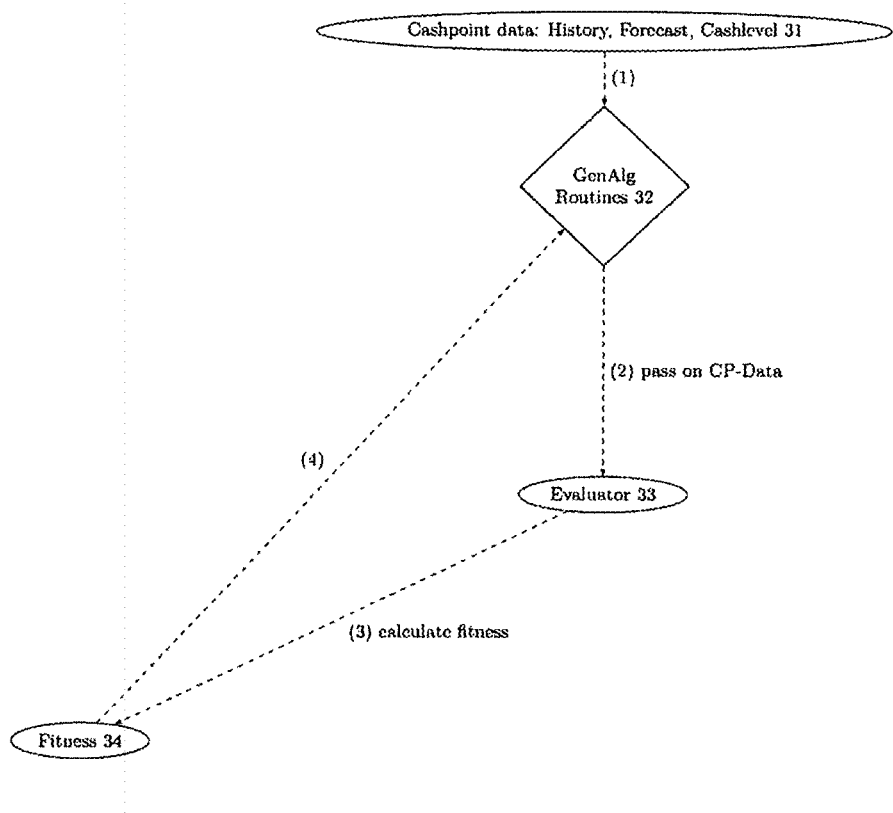

FIG. 3: A data transmission diagram illustrating how the cashpoint data is passed to genetic algorithm routines according to embodiments of the present disclosure. Afterwards, the evaluator engine is executed on the candidate solutions (given by vectors of parameters). The fitness is the overall evaluation score of the cash level adjustments obtained based in part on the forecast. This score is passed on to the genetic algorithm which then in turn performs the selection, combination and mutation operations. The cycle continues in this fashion, until a certain predefined threshold is reached.

Figure 4:
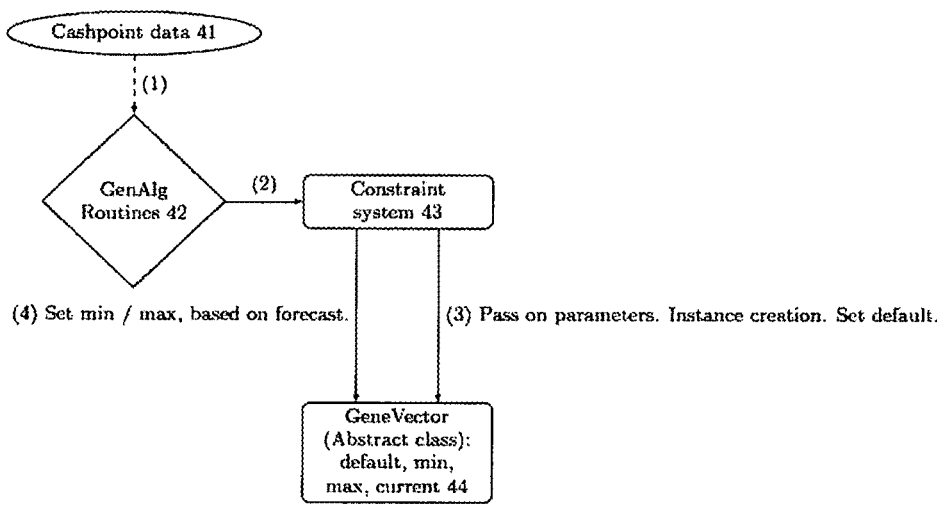

FIG. 4: A genetic algorithm with routines interacting with a constraint system according to embodiments of the present disclosure.

Figure 5:
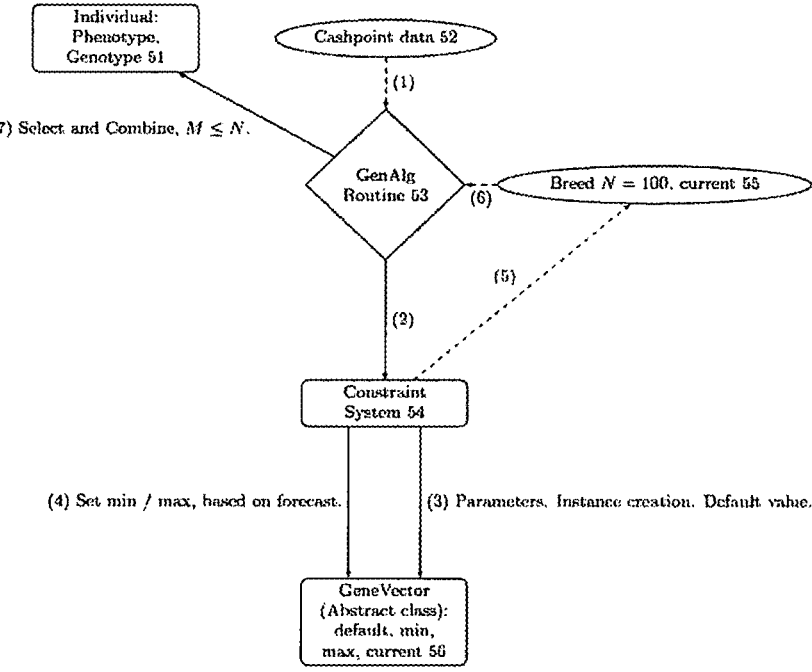

FIG. 5: An initial set of solutions, consisting of vectors of parameters, subdivided into functional categories, is bred via a probabilistic and constrained mechanism according to embodiments of the present disclosure.

Figure 6:
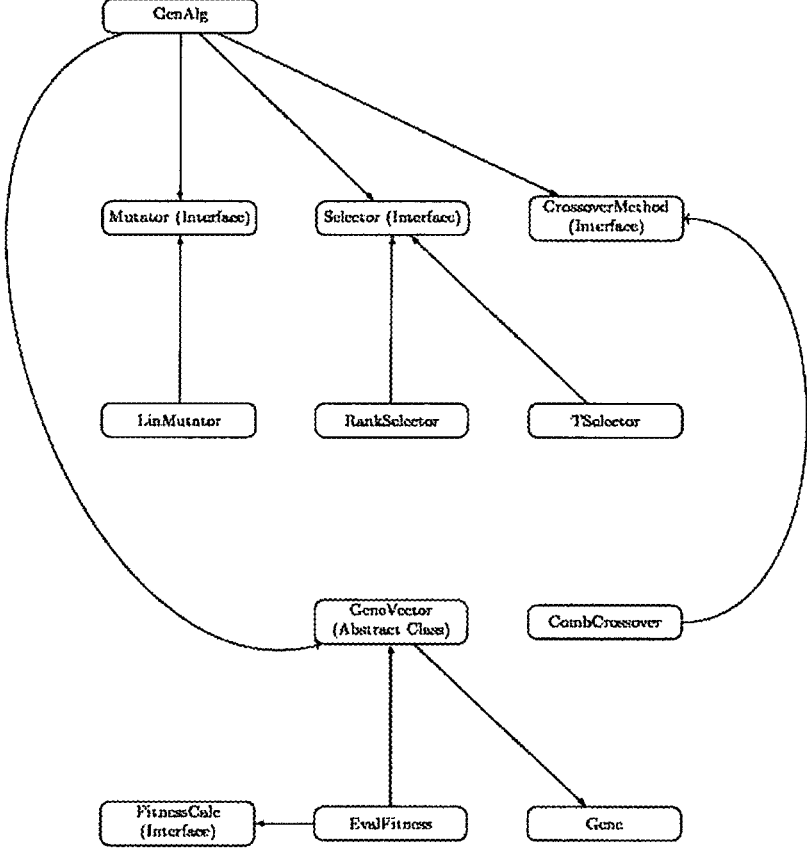

FIG. 6: The main routine of a genetic algorithm called GenAlg according to embodiments of the present disclosure. It instantiates the interfaces Mutator, Selector and CrossoverMethod, as well as the abstract class GeneVector.

Figure 7:
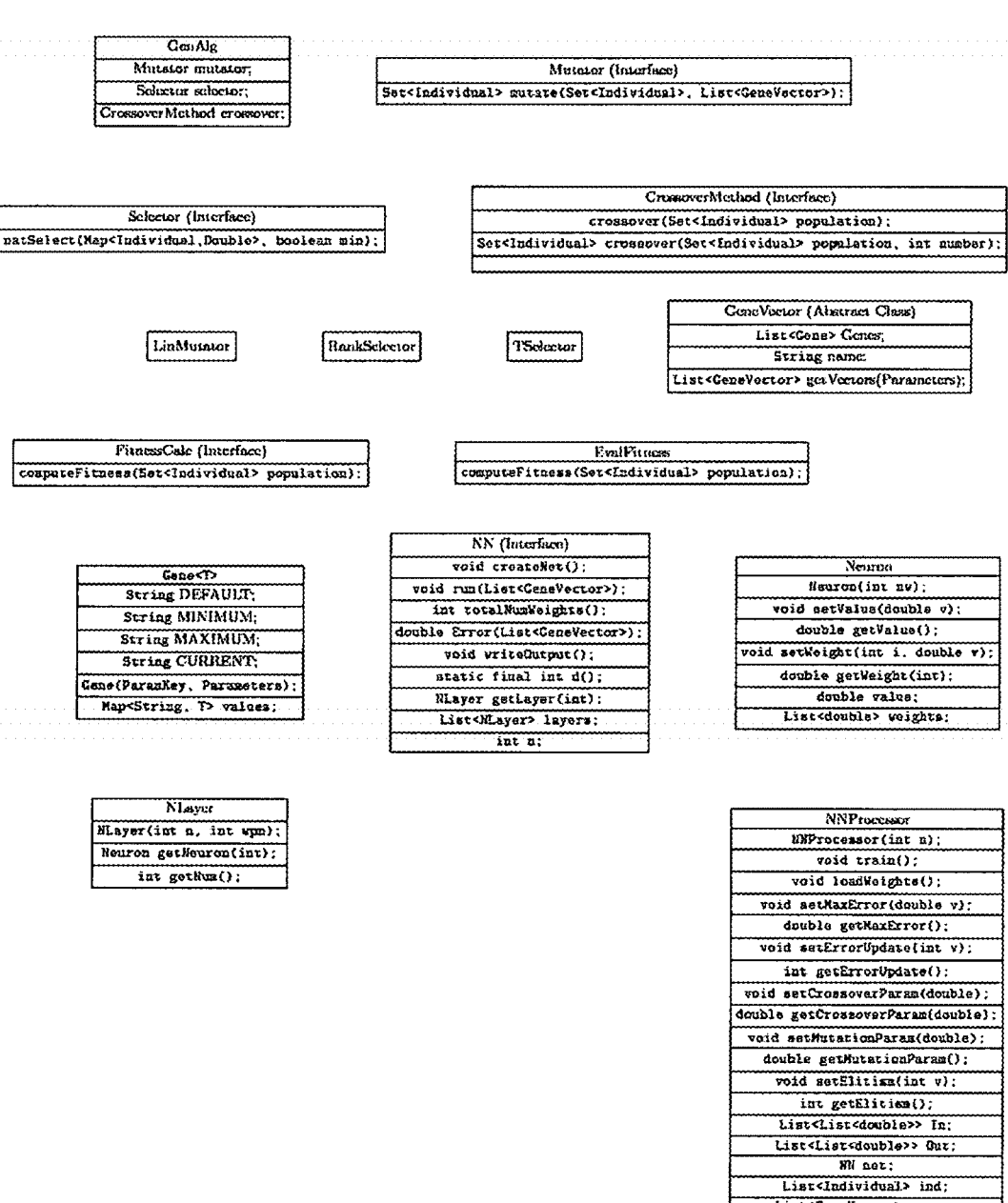

FIG. 7: Overview of the interactions of the components (classes and interfaces) of the genetic algorithm according to embodiments of the present disclosure.

Figure 8:
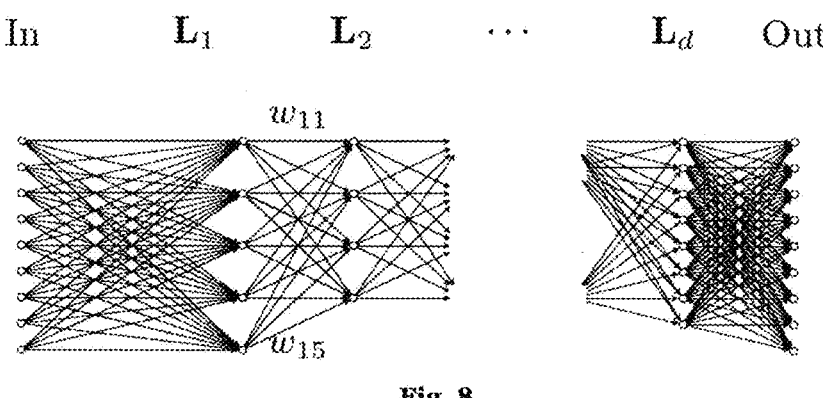

FIG. 8: Organization of the feedforward neural network according to embodiments of the present disclosure. Each neuron $x_{i-1,j}$ in layer $i-1$ is connected to every neuron in layer $i$ with weight $w_{i-1,j}$. The weights represent parameter values of a candidate solution in certain embodiments.

Figure 9:
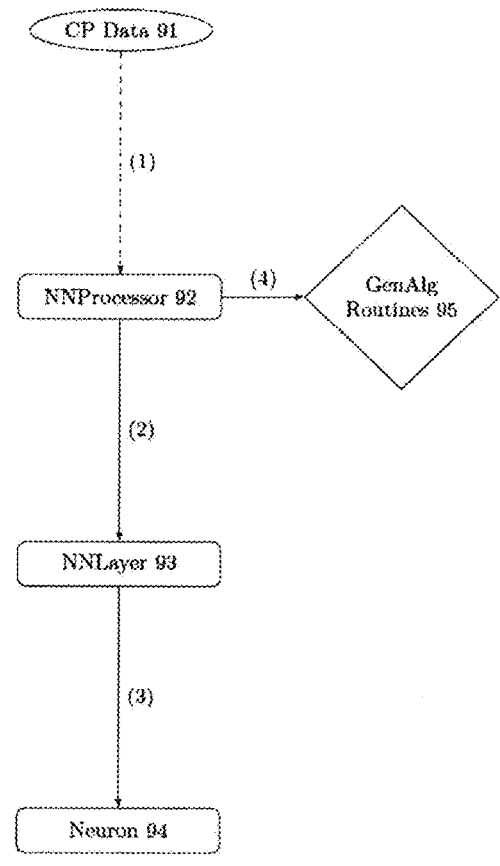

FIG. 9: Illustrates the interaction of the genetic algorithm used in embodiments of the present disclosure as a learning rule for the feedforward neural network. The call diagram illustrates the data structures for one embodiment of the neural network architecture.

Figure 10:
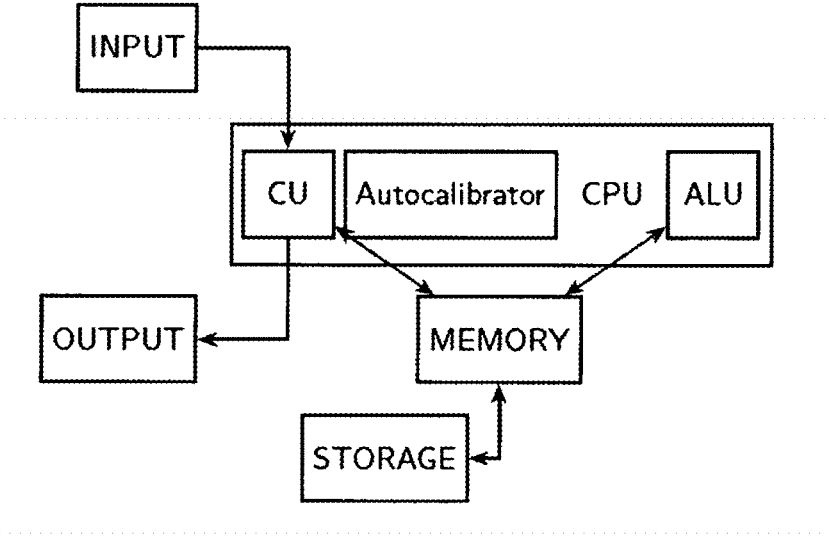

FIG. 10: An exemplary architecture of the auto calibrator system of embodiments of the present disclosure. The routines of the autocalibration mechanism are executed on a computing platform with an underlying von Neumann architecture.

Figure 11:
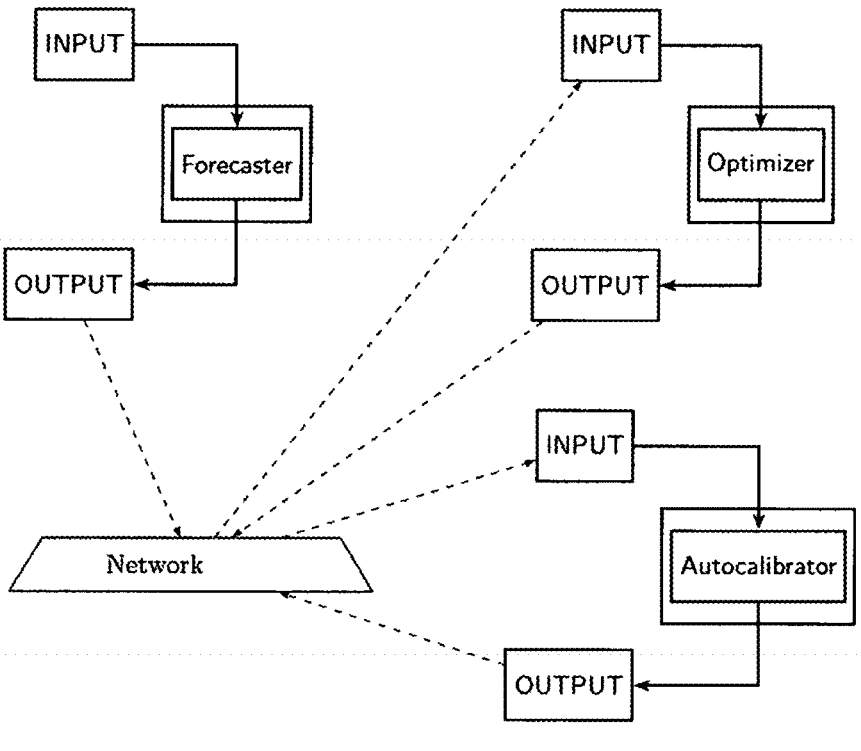

FIG. 11: Illustrates an embodiment where the auto calibrator system, the optimizer system and the forecaster system interact in a distributed systems arrangement, comprising separate von Neumann architectures for each system, as well as a secure network for communication.

Figure 12:
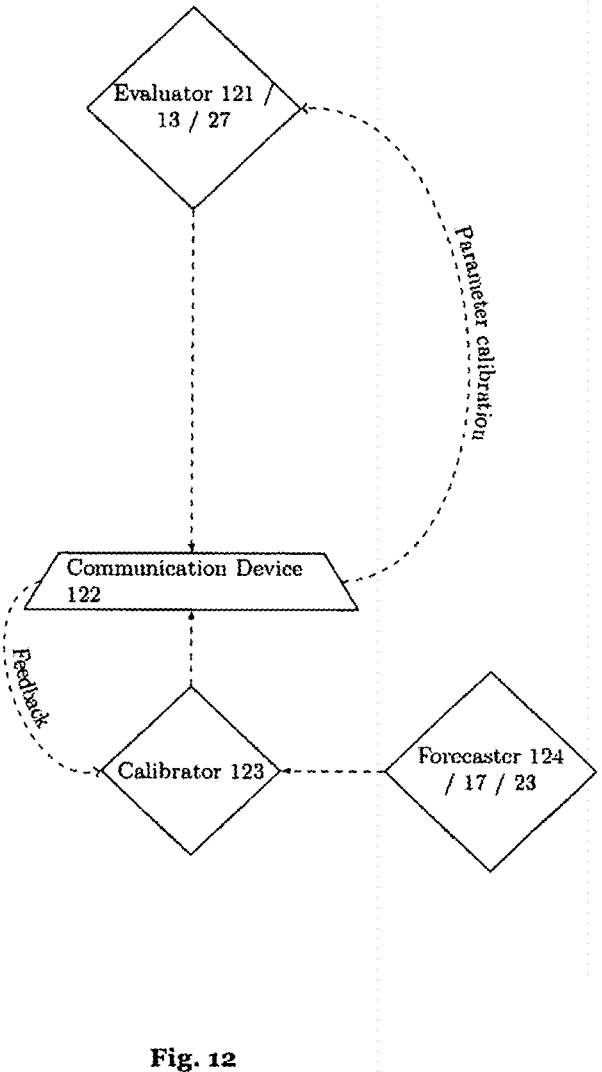

FIG. 12: Illustrates the robustly reactive and adaptive feedback loop communication between the calibrator and the evaluator system of embodiments of the present disclosure.

Figure 13:
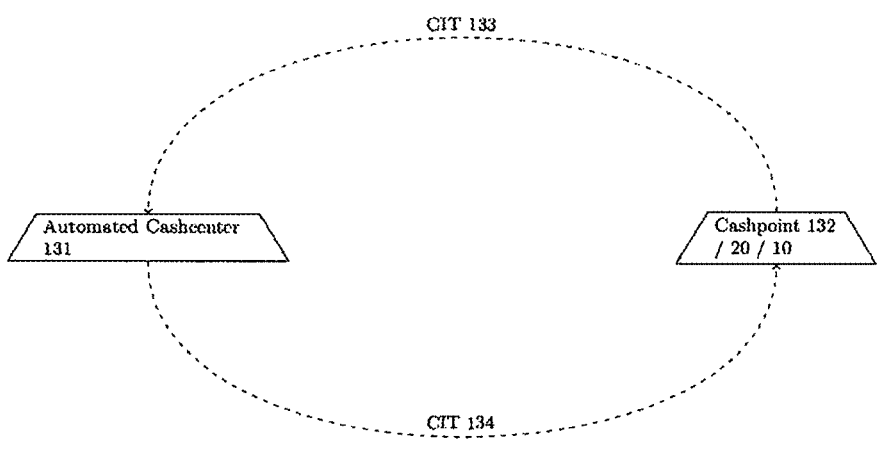

FIG. 13: During a service the bank notes containers at the cashcenter are filled with the exact right amount of cash as specified by the automated processes. The CIT (cash in transit) transports the bank notes containers to the cashpoint. At the cashpoint the residual cash inside the cashpoint is taken out and transported back via CIT to the automated cash center.

FIG. 14 Illustrates the prior state of the art where a calibrator operates based on input and feedback provided by the results of an optimizer that is run a large number of times within a feedback loop.

FIG. 15 Illustrates the robustly reactive and robustly adaptive feedback loop between an autocalibrator engine and an evaluator engine. After termination of the feedback loop, the calibration dataset is transmitted to an optimizer engine, which is run a single time to generate a plan for the optimization of cash levels.

The graphical elements used in the figures may be understood as follows:

Diamond shaped nodes: Engine or procedure, containing various classes that interact.

Rectangle shaped nodes: Classes, abstract classes and interfaces.

Ellipse shaped nodes: Processes (like function calls) and data.

Trapezium shaped nodes: The operation of a machine or device (and the information produced thereby).

Arrow: Calls between classes (arrow from class A to class B has the meaning: class A calls methods from class B, i.e. in particular A instantiates B).

Dashed arrow: Transfer of information (dashed arrow from class/process or Engine A to class/process or Engine B means data is passed from A to B; the mechanism of transfer may vary and depends on the implementation). Note that a call of class A to class B usually implies that data from B is passed on to A. In that case the dashed arrow from B to A is omitted.

DETAILED DESCRIPTION

Embodiments of the present disclosure will now be described.

A given set of adjusted parameters can be referred to as a calibration dataset and a parameter can be considered a constituent of a calibration dataset. As part of the operation of any engine or system automatically adjusting a calibration can produce so-called candidate calibration datasets. We call a feedback loop between engines and/or systems robustly reactive if it takes into account changes in contingencies, comprising at least deviations between forecasted datasets and actual occurrences, as well as changes in the configuration or behavior of the cash devices. The feedback loop is called robustly adaptive if it dynamically adjusts its behavior to the aforementioned changes. The present disclosure can fix the following domain specific criteria for the efficient automated production of an optimized calibration dataset. The criteria need to be fulfilled to ensure the continued operation of a cash device, cash center and/or other devices and/or systems involved in the cash supply chain.

Criterium 1: The structure of the search space of possible constituents of a calibration dataset should be taken into account in order to limit the number of unsuitable candidate calibration datasets, thereby making any search process time feasible. In particular, this may involve determining the semantic units between the constituents, i.e. the logical interdependencies. As well as determine the constraints fulfilled within these semantic units.

Criterium 2: Find a proper means to evaluate the quality of a given candidate calibration dataset, i.e. means for evaluation that a) converges quickly and is computationally efficient, b) that is the correct measure for quality, i.e. does not hide any critical situations.

Criterium 3: The feedback loop between the (auto-) calibrator and the evaluator should be robustly reactive and robustly adaptive.

Without specific reference to the domain of cash level management, the more general field of supply chain optimization has been extensively studied in the patent literature, for example, in U.S. Pat. No. 8,311,878 B2, U.S. Pat. No. 6,560,501 B1, U.S. Pat. No. 6,456,996 B1 and U.S. Pat. No. 6,272,483 B1.

In various documents, for example, U.S. Pat. No. 10,748,095 B2, an optimization process based on a deterministic forecast of withdrawal demand to determine cash refill amount, is described. These methods involve an inefficient and impracticable feedback loop between an external stochastic simulation process as well as an internal optimizer process as depicted in FIG. 14 of the present disclosure. In such proposals the plan for optimal cash refills is generated via a stochastic simulation process. However, the documents do not address the problem of finding a suitable calibration of the parameters necessary to reactively tune the optimization process to ensure its proper operation, thereby failing to meet Criterium 3. For example, in the aforementioned document, a minimal threshold called "minimum stockout ratio" is iteratively adapted based on a large number of iterations within a Monte Carlo Simulation process. Such a process requires a large amount of simulations for any individual ATM, making the process impracticable for the optimization of thousands of ATMs simultaneously, thereby failing to fulfill Criterium 2a. At the core of these methods is a deterministic optimization technique, e.g. integer programming in a particular embodiment, that is iteratively fed with the set of random input data. This entails a repeated operation of an optimizer engine as depicted in FIG. 14. In addition, especially in the more complex case of cash devices capable of deposit and withdrawal, the iteration may fail to find a proper threshold value. This is due to the size of the search space that in addition varies across the denominations and for different time periods, cf. Criterium 1 as well as 2a and 2b. These methods depend on a plurality of constraints, one of which is a safety-margin for an out-of-cash incident that is calculated depending on the minimum threshold. The described methods, do not address the problem of optimizing more general cash devices, do not contain a reproducible description to suitably as well as reactively optimize and evaluate, within a realistic timeframe, the plethora parameters that occur as part of any cash cycle optimization process. The underlying model of optimization remains fixed in this approach with only changing amounts resulting in varying minimum thresholds. A lack of a robustly reactive optimization of calibration datasets furthermore fails to meet any contingencies that might occur during the entire lifecycle of the cash supply chain, in contrast to Criterium 3.

Moreover, some references such as U.S. Pat. No. 6,031,984 discloses applications of over constrained systems to model optimization problems. Generally speaking, a constrained system includes a large number of variables and an objective function, for example. taking account of the overall cost within the optimization problem. The goal is to find solutions minimizing the value of this function, by a suitable search method. The constraints that one has to take into account are typically subdivided into so-called hard constraints and soft constraints. The hard constraints are required to be fulfilled in order to obtain a feasible solution. Violation of the soft constraints incur penalty costs, thereby increasing the value of the objective function. In real-world scenarios, there are usually various variables, entering the constraints, which are domain-specific, i.e. they depend on the particular real-world application of the model. We refer to "Integer Optimization by Local Search—A Domain-Independent Approach" by J. P. Walser (Lecture Notes in Artificial Intelligence, LNAI-1637, Springer Verlag, August 1999) for further background.

The document "Comparing parameter tuning methods for evolutionary algorithms" by S. K. Smit, A. E. Eiben (Proceedings of the IEEE Congress on Evolutionary Computation (CEC), pp. 399-406) discusses issues related to tuning the parameters of an evolutionary algorithm by describing a number of existing tuning methods, and presenting an experimental comparison among them. This work focuses on the parameter tuning problem for evolutionary algorithms. It does not apply to other use cases such as constrained optimization metaheuristic search. In addition, it is restricted to a general theoretical discussion that is provided on the basis of which no solution to a specific problem such as cash level optimization can be provided, as the specific problem involves many individual challenges to which no general solution procedure directly applies, compared with Criteria 1-3.

The document "Reactive Search and Intelligent Optimization" by R. Battiti, M. Brunato, F. Mascia (Operations Research/Computer Science Interfaces Series, Vol. 45, Springer, November 2008) addresses the problem of parameter tuning for stochastic optimization problems. As depicted in FIG. 14 this involves an inefficient and impracticable feedback loop between the calibrator and the optimizer. The reactive search paradigm described in this article aims at integrating sub symbolic machine learning techniques into stochastic search heuristics, in order to automate the parameter tuning phase and make it an integral part of the algorithm execution, rather than a pre-processing phase. The self-regulation property envisioned by the Reactive Search concept is motivated by the observation that in nature, and in particular in biological systems, feedback loops tend to be adaptive, i.e., they possess a learning component. The article goes on to discuss the main ideas leading to the Reactive Search paradigm, followed by a survey on the application of Reactive Search concepts to several types of stochastic search methods. This does not include the information on how to solve a meta-optimization problem in the domain of cash level optimization. Nor does the proposed paradigm provide a reproducible method to obtain a robustly reactive and adaptive fine tuning of parameters as compared with Criterium 3. The proposed method is in many situations impracticable, because the reactive search paradigm involves a feedback loop with an optimizer (compare with FIG. 14), that is used to evaluate a given current parametrization by generating a plan. In such a paradigm, the runtime of the proposed search mechanism can easily exceed bounds that are deemed acceptable in realistic settings, such as the setting of cash cycle optimization, where the optimizations for a large number of cash devices are to be calibrated within a reasonable timeframe. The optimizer in such a realistic setting would be responsible for the bulk of the runtime required to complete the parameter tuning phase, compared with Criterium 2a. Therefore, running the optimizer is time-consuming and additionally it only provides a snapshot which can hide critical situations. The plan generated by an optimizer, in the case of cash level optimization, does not provide a suitable measure for the quality of a calibration, compared with Criterium 2b. Furthermore, the paradigm is restricted in scope to those problems where an integration of parameter optimization into the execution of a stochastic optimization algorithm is possible. Also, it is not specified in sufficient detail how to go about such an integration in particular cases, compared with Criterium 1. This is due to the fact that any meta-optimization technique is highly dependent on the underlying specifics of the optimization problem under consideration. Each specific case therefore presents a unique problem to which a generalized machine learning mechanism cannot be described at the time of writing.

In the following description, for the purposes of explanation, specific details are set forth in order to provide a thorough understanding of embodiments of the invention. However, it will be apparent that various embodiments or examples may be practiced without these specific details. The figures and description are not intended to be restrictive. The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims. Specific details are given in the following description to provide a thorough understanding of the embodiments. However, it will be understood by one of ordinary skill in the art that the embodiments may be practiced without these specific details. For example, machines/apparatuses, information, programmable routines, data structures and other components may be shown as components in the form of a flowchart diagram, an information transmission diagram, a call diagram or a mixture of these in order not to obscure the embodiments in unnecessary detail. In other instances, well known machines, routines, algorithms, structures, and techniques may be shown without unnecessary detail in order to avoid obscuring the embodiments. Systems depicted in some of the figures may be provided in various configurations.

One aspect of the present disclosure relates to methods and systems for an optimized management of the cash level of a machine interchangeably referred to as a "cashpoint", "cash-dispensing device" or "cash device", which is a device that operates in order to meet the cash demands of customers. Examples of a cashpoint include, without limitation, an automated teller machine (ATM) for withdrawal of cash, a recycle machine capable of providing the functionality for withdrawal as well as deposit of cash by authorized customers, and/or a cash center within the branch of a bank or other location. To ensure the optimal supply of cash, taking into consideration factors such as transport costs, interest costs and/or the goal to ensure a sufficient amount of cash (i.e. service level), aspects of the disclosure may employ software tools or systems that are executed on specific hardware components. Certain aspects of the disclosure may rely on measured physical entities such as the recorded cash level of the cashpoint, and/or the invention may in certain aspects actively perform corresponding measurements of physical entities, e.g. on a regular basis. Aspects of the disclosure may then forecast a future cash demand and/or supply, on the basis of which an adjustment of the cash levels via services, i.e. replacement of cash, may be recommended by the system. In certain aspects, the disclosure may also actively and/or directly calibrate the cashpoint in accordance with the optimized cash level recommendation, preferably with as little as possible or even without human intervention. The underlying procedures to forecast and/or optimize the cash levels may depend on a large number of parameters. It is a very difficult and time-consuming process to adjust these parameters that need to be correctly adjusted. In addition, the adjustment of the parameters should be constantly renewed in order to adequately respond to changing conditions. In other words, the validity of a particular parameter adjustment may expire quickly. In the previous methods, the adjustment is therefore typically a reactive and repeating manual procedure. Aspects of the present disclosure, by contrast, provide for an automated parameter calibration in order to fully automate the cash level optimization of a cashpoint, multiple cashpoints, bank or retail branches or even entire cash centers.

To this end, aspects of the disclosure provide for an adapted metaheuristic search mechanism, by which the large space of possible parameters is traversed in an intelligent manner. We subdivide the parameters into categories, referred to as lamina in the ensuing description of the presently preferred embodiments. These lamina with the corresponding parameters are given as follows:

1. Lamina "Service Trigger" comprising parameters "sub-set of denominations" and/or "minimum stock levels":

Aspects of the disclosure allow to define a certain sub-set of denominations to be considered for triggering a service. In case the expected cash level for at least one denomination from the sub-set of denominations is expected to be less than its minimum stock level, a service for the next upcoming service option is triggered, otherwise not.

2. Lamina "Service Level" comprising parameters for "buffer factors" and/or "minimum balances":

In order to calculate the cash levels for a certain range the expected values as well as a buffer based on the uncertainty of the forecast may be taken into account. But instead of the uncertainty measure itself, a weighted buffer is preferably used by applying buffer factors on the uncertainty measures derived from the forecast.

Moreover, minimum balances can be defined to prevent that the cash levels will be reduced to a value lower than the configured minimum.

3. Lamina "Service Interval" comprising parameter "maximum service interval":

It is sometimes necessary to restrict the cash service range due to organizational reasons. In that case a maximum service interval can be defined to prevent that the cash service ranges exceed the maximum range configured.

The disclosure may involve the communication of two (or more) devices and/or systems as illustrated in FIG. 12. As can be seen, a calibrator 123 may be adapted for calibrating one or more parameters, preferably reactively and/or continuously, in response to current information provided by an evaluator system 121, communicated via some communication device 122. The resulting network of interacting components, preferably with a feedback loop, furnishes a solution to the problem outlined, as will be explained in more detail further below.

Optionally, automated parameter adjustments may use techniques of artificial intelligence. In this context, aspects of the invention may provide an adapted metaheuristic search, possibly taking into account the functional properties of specific parameters. The metaheuristic may be coupled to a neural network, which provides a mechanism to store previous possibly useful parameter adjustments. In such a way the system may comprise a memory, thereby reducing the computational burden of having to recompute cost-minimal parameter adjustments that have been obtained in an earlier run of the metaheuristic search. In addition, a neural network may provide the possibility to improve the evaluation of the overall costs of a particular parameter adjustment, known as the problem of fitness evaluation of metaheuristic search methods.

Moreover, the automated cash level optimizer system may be realized as a distributed system. This has the advantages that the computational burden is distributed among many systems, that no mutual interference occurs and the minimization of costs to a company by being able to offer solutions as a service (SaaS model). The disadvantages of a distributed systems solution comprise a higher network load, the risk of data loss both physically as well as legally. The components of the system, including in particular the calibrator system, the evaluator system and the optimizer system (possibly subdivided by further components according to each particular embodiment), could communicate via a network, as part of a reactive feedback loop. An example of a distributed systems approach is illustrated in FIG. 11.

Variations of such a setup are also conceivable, e.g. it could be the case that the calibration system is subdivided into separate components which communicate via a communications network. One such component may be the neural network, separate from the metaheuristic search which may in turn be separated from a system responsible for the subdivision of the parameter search space and so on. Likewise, the other components illustrated in FIG. 2 may be further separated into sub-components making up an even larger distributed system.

Before a detailed discussion of the present disclosure, some expressions used herein shall be clarified:

A "cashpoint", also referred to as "cash-dispensing device" or simply "cash device", is a device that comprises an internal storage for storing cash. The cash can be withdrawn and possibly deposited, e.g. by a customer and/or by authorized personnel.

The "cash level" of the cashpoint is the amount of cash in the cashpoint. The cashpoint may comprise a memory means, such as a memory chip, to keep track of turnovers of withdrawals, deposits and/or the current cash level. In addition, the cashpoint may have a connection to a (secure) network.

The "history" is data comprising past turnover of withdrawals and/or deposits of the cashpoint.

A "calibration" is a set of values of parameters usable to fine tune a mathematical optimization technique.

A "forecast" is data comprising estimated future withdrawals and/or deposits of the cashpoint. A forecast may be obtained using a standard statistical procedure.

Functional Description of the Present Disclosure.

Figure 1:
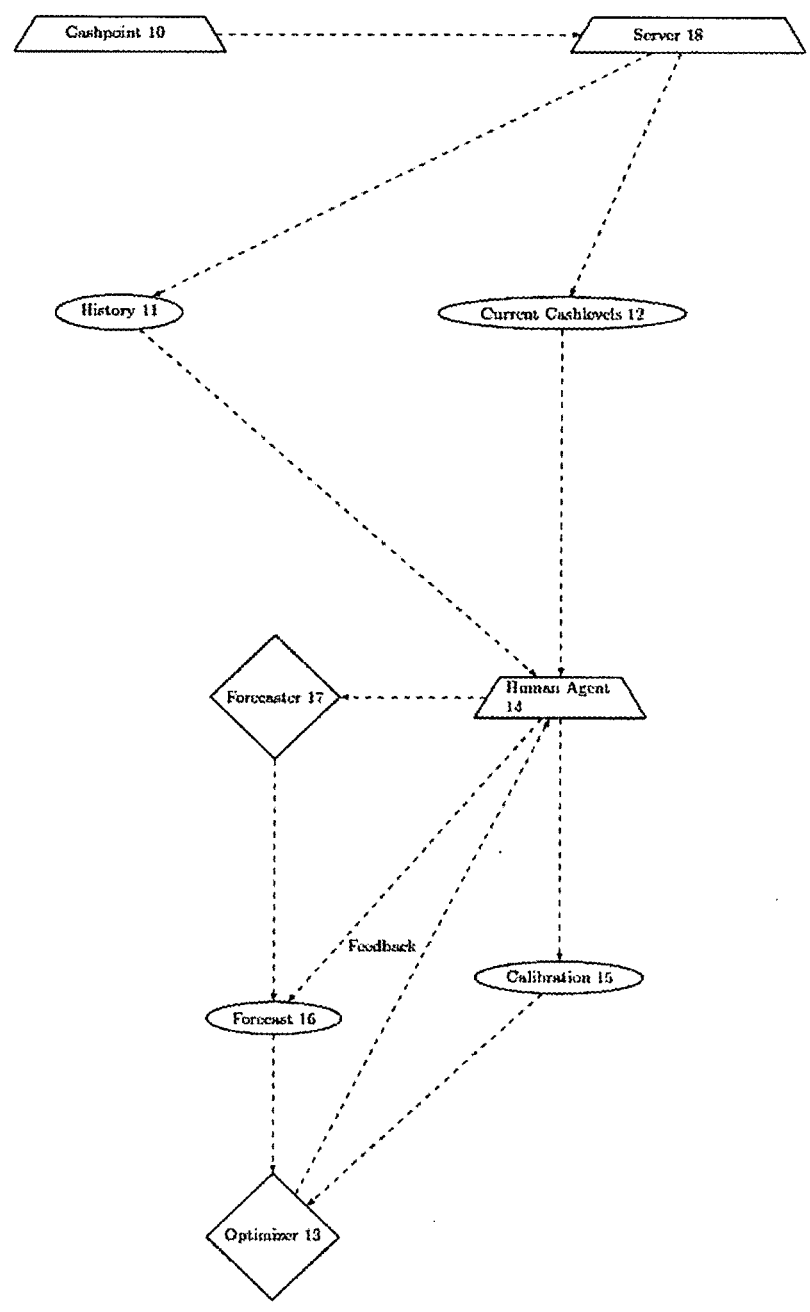
FIG. 1: A data transmission diagram illustrating the (manual) data transfer to an optimizer according to the prior art.

Coming back to the domain of cash level management, FIG. 1 is a data transmission diagram that provides an illustration of a typical process according to the prior art, which includes the following:

The cashpoint 10 records and stores its current cash levels 12 which are at all times transmitted to a server 18. The server 18, based on this information, stores a history 11 as well as current cash levels 12 inside a database. Based on the information stored in the database a forecast 16 is created by a forecaster 17 and passed on to an optimizer system 13. Such a forecast 16 is typically derived by a software-based forecaster 17 using known mathematical/stochastic models and indicates a prediction of the transactions (e.g. withdrawals, deposits) that will likely occur in the future, e.g. for the next 45 days.

Based on the history 11 and the forecast 16, it is possible to generate a calibration 15 for the cashpoint 10. Such a calibration 15 typically indicates, among other aspects, how much excess cash, in the sense of a buffer, should be employed at the cashpoint 10 to accommodate the expected transactions as well as unexpected peaks that might occur. In the example of FIG. 1, the calibration 15 is reactively and repeatedly adjusted by a human agent 14, based on evaluation of the calibration 15 and, if necessary, the plan received from the optimizer 13. The feedback loop ends on the basis of the decision of the human agent 14.

Once the human agent 14 is satisfied with the calibration 15, a plan is generated which typically indicates one or more points in time when the cashpoint 10 has to be re-stocked with cash within a predetermined time span, e.g. for the next 30 days. Based on the plan for optimization of cash levels, instructions for cash level adjustments are passed on to the cashpoint 10. As can be seen, the procedure according to the prior art is based to a large extent on the individual decisions of the human agent 14 and is thus highly subjective and inefficient.

Altogether, in the prior art, human intervention is required at least in the following steps: import of the historical information from the cashpoint 10 in a suitable database and the optimizer 13 with concurrent calibration of parameters. Very many optimization runs are necessary in order for the human agent to find the best parameter values. The maintenance of the component systems involved, ensuring their proper operation is also part of human intervention. Therefore, the entire mechanism of the cash level adjustments depends on a human agent who acts as an intelligent and self-aware feedback channel, who modifies the parameter values according to his observations about the behavior of the optimizer 13. What is missing is a reactive search strategy which combines the optimization procedures with an automated calibration of the parameter search space. However, such mechanisms are highly dependent on the specific features of the optimization technique and the overall specification of the system under study. In order to address the automated fine-tuning problem, the consensus of the people having ordinary skills in the art is that there is no general method for automated calibration of parameters for optimization algorithms known. Each case therefore represents a unique challenge necessitating a non-obvious solution strategy, meeting the unique challenges presented by the individual case under consideration.

In summary, the known approaches do not enable an automated adjustment of the parameter search space, a so-called automated calibration. Furthermore, it is desirable to have fully automated cash level adjustments, without any need for human intervention. It is therefore the technical problem of the present invention to provide an automated approach for the cash level optimization of a cashpoint, thereby at least partly, overcoming the above explained disadvantages of the prior art.

Figure 2:
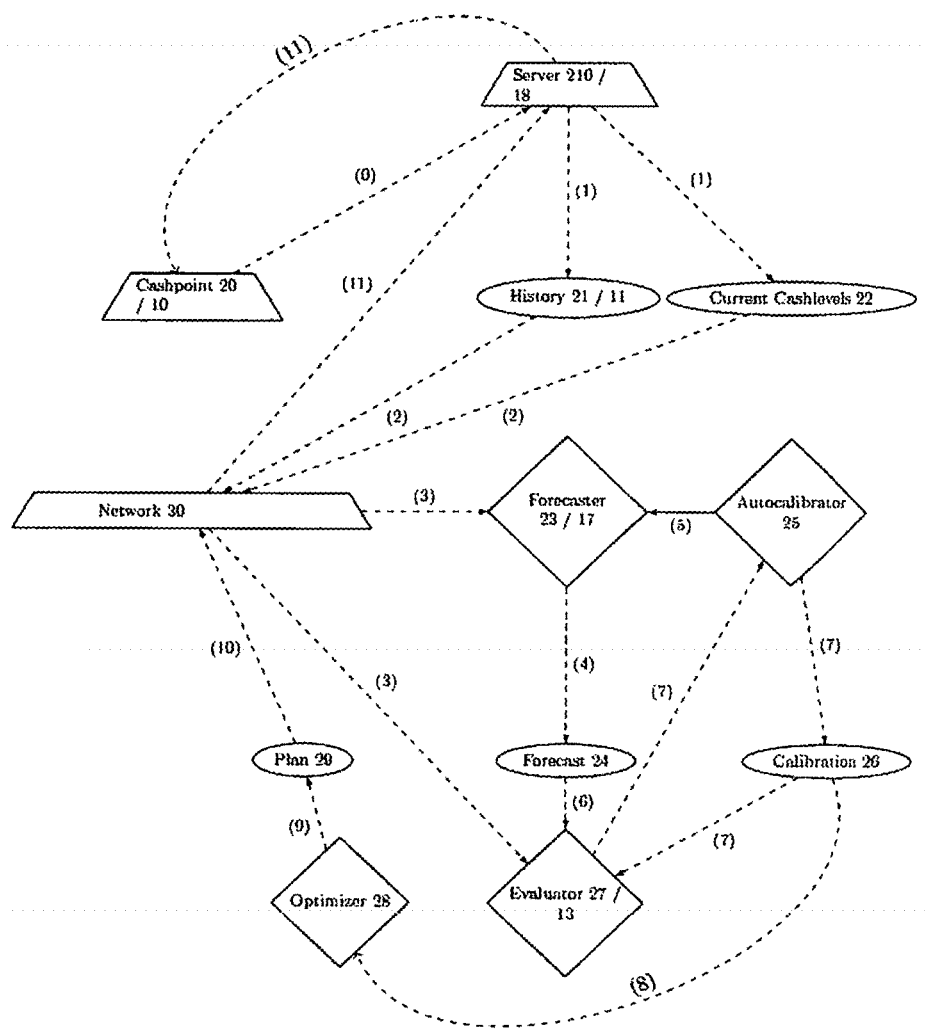
FIG. 2: A data transmission diagram illustrating automated cash level adjustments according to embodiments of the present disclosure. The cash device passes on its historic cash level data to the autocalibrator engine, evaluator engine

FIG. 2 is a data transmission diagram that illustrates a closed loop cashpoint optimization scheme in accordance with an example of the present disclosure. The network 28 is a network that may be used for processing large amounts of data and that admits the secure transmission of cash level data. This may be a wireless network, a wired network, or a combination of a wired and wireless network, relying on a protocol for encryption and secure transmission of data, such as secure sockets layer (SSL) or transport layer security (TLS). Examples of suitable networks include the Internet, a personal area network, a local area network (LAN), a wide area network (WAN), or a wireless local area network (WLAN). A wireless network may include a wireless interface or combination of wireless interfaces. A wired network may include a wired interface. The wired and/or wireless networks may be implemented using routers, access points, bridges, gateways, or the like, to connect devices in FIG. 2. The cashpoint 20 comprises, in one particular embodiment, a system endowed with an integrated radio chip, for secure transmission of cash level data. A memory chip provides information at all times on the level of cash inside 22 and/or where and/or when the device was opened. This means that banknotes that are deposited and stored in the device can be made available again for dispensing.

Current 22 and/or past 21 cash level information is transmitted, via the secure network 30, to an evaluator 27 and later passed on to an optimizer 28. The optimizer 28 stores the relevant historic data 21 and, based on a mathematical optimization technique, creates a plan 29 for optimal cash level adjustments. In the particular embodiment, the forecaster 23, evaluator 27 and optimizer 28 could be computer implemented systems which are integrated into one computing system, or they could be part of a distributed network of computer systems, sharing information via a secure network protocol. In the particular embodiment, the data obtained from the cashpoint 20 is imported into a database which is then accessed by the forecaster 23. This is facilitated by the Network system 30 which obtains the data from the cashpoint 20 and facilitates the communication with the other components displayed in FIG. 2.

In previous methods and systems (see FIG. 1), the calibration 15 needed to be executed by a person who would adjust the parameters by hand within the system. However, in the present disclosure this step is automized, see FIG. 2. The auto calibrator system 25 interacts with the evaluator 27 and reactively generates a cost-optimal calibration. In the particular embodiment based on an evolutionary meta-heuristic, this reactive adaptation is illustrated in FIG. 3. The behavior of the evaluator 27 is influenced and reactively adjusted by the auto calibrator 25. What results is a self-regulating system comprised of an autonomic network of interacting components with robustly adaptive feedback channels, i.e. depending on its memory the auto calibrator 25 responds variously to the computations of the evaluator 27.

In addition, the novel scheme of interacting components, together with our novel mechanisms, results in synergistic effects. The auto-calibration requires a means to repeatedly evaluate the quality of a calibration. In one particular embodiment this evaluation is based on the evaluation dataset, generated by the evaluator 27. To be precise, what is being done in this step is an evaluation of the relative quality of a given calibration. This means the evaluator 27 computes a total score, based on several quality criteria that encapsulate the objectives of minimization of the total costs and maximization of the total service level. Since these objectives are contradictory, weighting factors are defined to find the best combination. This is what we mean by an evaluation of a calibration in the presently preferred embodiment.

In at least one embodiment, the instructions computed by the optimizer 28, based on the calibration obtained by the auto calibrator 25, are sent directly to the Server 210 and then passed on to the automated cash center 131, such as depicted in FIG. 13. At the automated cash center these instructions are passed on to the fully automized machines responsible for the further processing of cash. When the cashpoint is serviced (see. FIG. 13), by authorized personnel, new cash is put inside the machine and the remaining cash inside the cashpoint is transported to a cash center by the CIT (cash in transit) 133 where further processing takes place. The cash is stored securely and handled efficiently by the use of designated bank notes containers. The bank notes containers are uniquely identified and tracked via barcode or RFID tracking.

There are two sets of bank notes containers. The first set of containers resides at the automated cash center 131, does not contain any cash at the outset and is filled with cash according to the instructions. Then it is taken by the CIT 134 to the cashpoint 132. The cashpoint 132 contains the second set of containers with the residual cash inside. At the point of a service the first set of containers is exchanged with the second set of containers. The CIT 133 transports the second set of containers to the automated cash center 131. The second set of bank notes containers is further processed in a fully automized fashion at the cash center 131. The processing at the cash center 131 consists of the following steps: The second set of bank notes containers are opened by a loading module via a gripping robot that takes staples of cash and inserts them into high speed sorting machines. The machines are capable of banding, welding, unzipping and disposing of packaging. Before the execution of a service, as depicted in FIG. 13, the loading module fills sorted bank notes into the first set of bank notes containers. Exactly the right amount of cash is inserted, as per the instructions sent to the cash center 131. This also includes the instructions at exactly which points in time, in the future, services should take place, based on the plan generated by the optimizer system and on the operation of the auto-calibrator system. The particular embodiment enclosed can be implemented and tested by a person having ordinary skills in the art.

Altogether, the closed loop scenario of present disclosure comprises the following steps:

1. The cashpoint 20 passes on its historic data 21, via the secure network 28, to the forecaster 23, as well as its current cash levels 22 to the auto calibrator system 25. The interaction of the cashpoint 20 with the other components may be facilitated by the server 210, which is configured for storing the relevant information and translating it into a format readable by the cashpoint 20 and the other systems, respectively.

2. A forecast 24 is created by the forecaster system 23.

3. The forecast 24 is accessed by the auto calibrator 25, on the basis of which, in addition to the current cash levels 22, it creates a calibration 26.

4. Calibration 26 and forecast 24 are passed on to the evaluator 27 and a current evaluation dataset is fed back into the auto calibrator 25. The feedback loop (7) ends when optimal parameter values have been obtained, as decided by a convergence criterion of the auto calibrator 25.

5. The optimizer 28 creates a plan 29 for future cash level adjustments.

6. The plan 29 is transmitted to the Server 210, via the secure network 28. The cashpoint 20 is serviced based on this information as outlined above and further illustrated in FIG. 13. This closes the fully automated loop.

As FIG. 15 illustrates, a robustly reactive and robustly adaptive feedback loop with an evaluator engine 152, ensures a practicably efficient evaluation of the quality of a candidate calibration dataset. After termination of the feedback loop, the optimizer engine is run a single time to generate a plan dataset. The evaluator engine takes into account the forecast as well as deviations between forecast and history, cf. FIG. 2. This allows the autocalibrator to flexibly adapt to changing contingencies of the entire cash supply chain, for a large number of cash devices simultaneously, in a fully automated and highly time efficient fashion. In addition, the evaluation of the quality of a calibration is very different from the interpretation of the information contained in the plan generated by an optimizer. Therefore, the feedback loop of the prior art, as illustrated in FIG. 14, is not only unsuitable in practical real-world applications because of its inefficiency, but it also does not even reflect a valid method for proper evaluation of a calibration dataset. The invalid method of the prior art as illustrated by FIG. 14 thereby would result invariably in errors of calibration and thereby failure of operation of cash devices, e.g. because of out-of-cash incidences.

Structural Description of the Autocalibration of the Present Disclosure.

The system requires a large number of free parameters to be adjusted, i.e. it relies on the calibration. This adjustment is executed by an autocalibration mechanism. We give a detailed description of one particular possible embodiment for such a mechanism, based on an evolutionary metaheuristic coupled to a feedforward neural network. This is meant as an illustrative description and does not exclude other embodiments using other methods of artificial intelligence. As a non-exhaustive list of examples we mention other possible search strategies such as: a) stochastic gradient descent, b) a feedforward neural network using backpropagation, c) a recurrent neural network (RNN) with a directed acyclic graph, d) a RNN with a directed cyclic graph, e) a continuous time RNN, f) a multiple timescales RNN, g) a heuristic or metaheuristic search or heuristic optimization technique, h) techniques mentioned in g) combined with a), b), c), d), e) or f), as well as i) any suitable combination of the previously mentioned or other search techniques.

In the particular embodiment illustrated by the drawings, via an evolutionary metaheuristic, the parameter search space is subdivided into functional categories. To this end a data structure which furnishes a lamination of the search space, is employed. The parameters within a category are encoded as so-called gene vectors. An initial population is obtained by a randomized breeding of potential solutions. Each solution is constrained, by a so-called constraint system 43. The constraint system 43 encodes the semantic interrelationships between the parameters, within a given category. Hence any potential solution remains within the bounds imposed by the constraint system. After the initial breeding phase, the laminated parameter structure is passed on to a genetic algorithm 32. The genetic algorithm 32 performs the operations of mutation, combination and selection (using tournament and rank selection), within the bounds imposed by the constraint system. These operations are repeated until, after a predetermined number of trials, no new optimal solution can be reached. The solution, consisting of parameters, is then passed on to the optimizer system 33. The system creates in turn a plan for optimal cash level adjustments.

At the point before the cash level data 31 is transmitted to the optimizer system, it is first passed on to the genetic algorithm routines 32. The candidate solutions obtained within the genetic algorithm are then passed on to the evaluator 33, in order to obtain the necessary information to calculate the fitness 34 of the candidate solutions. The genetic algorithm interacts with the constraint system 43, which determines the bounds, within which any candidate solution (i.e. vectors of parameters, subdivided into functional categories), has to remain.

An initial set of individuals, i.e. candidate solutions is generated in a random fashion 55, after the constraint system has determined the semantic bounds of the functional categories of parameters. Starting with a set of N=100 candidate solutions 55, the genetic algorithm routines 53 execute the selection and crossover combination operations, resulting in 0<<M≤N candidate solutions 51, cf. FIG. 5. The genetic algorithm routines themselves, comprise various components. Mutation, crossover and selection are classes that facilitate the generation and combination of new solution candidates. The operation of selection comprises a rank selection and/or a tournament selection. Rank selection is based on a probability ranking of individuals, the most fit solution being assigned the highest probability for selection, then the second highest probability for the second most fit solution and so on.

Denote by $0 < P_c < 1$ the pre-defined probability constant. Then, based on ranking by fitness, the assigned probabilities are given as follows:

$$P_1 = P_c, P_2 = (1-P_c)P_c, P_3 = (1-P_c)^2 P_c, \ldots, Pn-1 = (1-Pc)^{\char94}(n-2)Pc, Pn = (1-Pc)^{\char94}(n-1).$$

The tournament selector routine contains in addition a distance measure for parameters. This determines the diversity of prospective solutions. The diversity measure and the rank measure are then aligned to select solutions. The fitness function determines the overall cost of the cash level adjustments, obtained from the parameters in the evaluator engine. The evaluation is comprised of at least a service level evaluator, service trigger evaluator and a cost evaluator with an appropriate weighting of the various resulting evaluator scores. The costs that enter in the cost evaluation consist of service costs, stock costs, interest costs, processing costs and penalty costs for stockouts.

Summarizing, the operation of one embodiment of the genetic algorithm is based on the following structure. An 8-tuple $(X, \{L_j, \prec_j\}_{j=1}^d, C, \{Dist_j\}_{j=1}^d, S, S_{div}, S_{rank}, f)$ comprising:

The solution search space X, subdivided into lamina $$X = \bigcup_{j=1}^{d} L_j$$

such that $L_i \cap L_j = \emptyset$, $i = 1 = j$.

Each lamina $L_j$ is endowed with a vector of strict partial orderings $$\prec_j := (\prec_{jk})_{k=1}^{n(j)}$$

and $L_j \subset R^{n(j)}$, where n(j) denotes the number of components of a vector contained in $L_j$.

A set of distance measures $Dist_j$ such that for given $x, y \in L_j$ $$Dist_j(x,y) := \#\{k:(x_k \prec_{jk} y_k) \otimes (y_k \prec_{jk} x_k)\}.$$

where $\otimes$ denotes the exclusive-or operation, i.e. the number of differing components of the two vectors. This furnishes a metric on $L_j$, for each $1 \leq j \leq d$.

A semigroup S, generated by the genetic operations mutation and recombination. We consider here a semigroup, since these operations are non-deterministic. The operations of the genetic algorithm furnish a semigroup action $S \times X \to X$. Note that if S where a group, the action would partition X into the orbits of the action. In our system the partition by the lamina is pre-defined.

The rank measure $S_{rank}: X^N \to [0,1]$ as defined above (it depends on the pre-defined value $P_c$). The diversity measure $S_{div}: X^N \to [0,1]$ defined with the help of the distance measures $Dist_j$ (the vectors are compared pairwise)

$$S_{div}(\vec{x}, \vec{y}) := \left(Nd \sum_{j=1}^{d} n(j)\right)^{-1} \sum_{i=1}^{N} \sum_{j=1}^{d} Dist_j(pr_j(x^{(i)}), pr_j((y^{(i)})),$$

where $\vec{x} := (x^{(1)}, x^{(2)}, \ldots, x^{(N)}) \in X^N, \vec{y} := (y^{(1)}, y^{(2)}, \ldots, y^{(N)}) \in X^N$ and $pr_j: X \to L_j$ denotes the projection onto the j-th component.

The fitness function $f: X \to R$, i.e. $x^* \in X$ is a cost-optimal solution if $f(x^*) \leq f(x)$ for each $x \in X$.

A constraint system $C := \{c_1, c_2, \ldots, c_d\}$, consisting of logical operations $c_j: L_j \to \{0,1\}$ for $1 \leq j \leq d$. Such that $x \in L_j$, then $$c_j(x) = \begin{cases} 1, & \text{constraints fulfilled,} \\ 0, & \text{not fulfilled} \end{cases}$$

Definition. A genotype is a vector $(f_j)_{j=1}^{d}$ consisting of d maps $f_j: [3]^{n(j)} \to L_j^{n(j)}$ such that for each $1 \leq j \leq d$ the map $f_j$ is the vector $f_j =$ $(g_{1,j}, g_{2,j}, \ldots, g_{n(j),j})$ consisting of maps $g_{k,j}: [3] \to L_j$ for $1 \leq k \leq n(j)$. (Notation: $[n] := \{0, 1, \ldots, n\}$, $n \in N$).

The values in [3] represent the states: 0 DEFAULT, 1 MIN, 2 MAX and 3 CURRENT

A phenotype is a vector $v \in \mathbb{R}^{\sum_{j=1}^{d} n(j)}$.

A genotype therefore fulfills the role of an internal representation of the parameter search space. The phenotype is simply a calibration. Denote by G the set of all possible genotypes. The genotypes are converted into phenotypes in the following way. The transformation T: $G \to \mathbb{R}^{\sum_{j=1}^{d} n(j)}$ is defined by $$G \ni (f_j)_{j=1}^{d} \mapsto (f_j(3, \ldots, 3))_{j=1}^{d} \in \mathbb{R}^{\sum_{j=1}^{d} n(j)}.$$

Note that G is a subset of the set $\times_{j=1}^{d} \text{Map}([3]^{n(j)}, L_j^{n(j)})$ of all maps from $[3]^{n(j)}$ to $L_j^{n(j)}$.

In the particular exemplary case considered here there are d=3 lamina. Each lamina corresponds to a category of parameters in the sense that:

$L_1$ comprises vectors $x^{(1)}$ representing the n(1)=2 parameters that belong to the category Service Trigger. The parameter sub-set of denominations is represented by a set $x_1^{(1)}$ of denominations which is a subset of all permissible denominations D. The parameter minimum stockout levels is represented by a map $x_2^{(2)}: x_1^{(1)} \to \mathbb{N}^{|x_1^{(1)}|}$ from the sub-set of denominations to the positive integers, i.e. each denomination of the sub-set gets assigned a positive integer. The strict partial order $\prec_{11}$ is given by the proper subset relation $\subset$ and the strict partial order $\prec_{12}$ is given by the standard less-than relation < for positive integers applied component-wise to the set) $x_2^{(2)}(x_1^{(1)})$.

Each representation can assume four possible values according to the different states. The DEFAULT state is the parameter value pre-defined in the database. The states MIN, MAX are adjusted according to the following heuristics: The sub-set of denominations is determined based on the forecast and the current cash levels, i.e. the denominations that are depleted fast on average and are withdraw-heavy (i.e. have more withdraws than deposits on average) form the MAX sub-set of denominations, the fastest running denomination (s), that have maximum container capacity and that are in addition withdraw-heavy form(s) the MIN sub-set. The heuristics for the parameter bounds for minimum stockout levels is analogous to the heuristics for the parameters bounds of minimum balances to be described below.

The constraint system $c_1$ returns 1 whenever the CURRENT state of the parameter representation is within the bounds as specified by the states MIN and MAX, i.e. whenever the sentence $(g1,1(1) \prec 11 \ g1,1(3) \prec 11 \ g1,1(2))$ $\wedge (g2,1(1) \prec 12 \ g2,1(3) \prec 12 \ g2,1(2))$ is true. The check is facilitated by the strict partial orders.

$L_2$ comprises vectors $x^{(2)}$ representing the n(2)=2 parameters that belong to the category Service Level. The parameter buffer factors is represented by real number $x_1^{(2)}$ and likewise so is parameter buffer factor weekend $x_2^{(2)}$.

The strict partial orders $\prec_{21}$, $\prec_{22}$, $\prec_{23}$, $\prec_{24}$ are given by the standard less-than relation $<$ for real numbers. The parameter minimum balances is represented by a map$^{\text{xs}(2)}$:

$\mathcal{D}\backslash x_1^{(1)} \to \mathbb{N}^{|\mathcal{D}\backslash x_1^{(1)}|}$ from the set of denominations to positive integers, i.e. each denomination gets assigned a positive integer. The strict partial order $\prec_{25}$ is given by the standard less-than relation $<$ for positive integers, applied componentwise to the set$^{\text{xs}(2)}$($\mathcal{D}\backslash x_1^{(1)}$). The MAX and MIN states of the buffer factors and minimum balances are determined by the following heuristics: The MIN buffer factor is set to 0.1. The forecast is run over the past historical data. For each service that has taken place in the past, the aggregated forecasted withdrawals and aggregated turnovers are calculated (per denomination and per service date), under the assumption that the service has been left out (for each service date). These values are put in a table, one value for each service date. The deviation for each service date is the aggregated withdrawals minus the aggregated turnovers multiplied with the buffer factor. The maximum of the deviations, where buffer factor is taken to be the MIN buffer factor, yield the MAX state for a denomination's minimum balance. The buffer factor is now iteratively increased by 0.1 increments until the evaluated maximal deviation has reached its minimum value >0. This minimum value is the state MIN for a denomination's minimum balance. The reached value for the buffer factor is the state MAX for the buffer factor.

$L_3$ comprises vectors $x^{(3)}$ representing the $n(3)=1$ parameters that belong to the category Service Interval. The parameter maximum service interval is represented by a positive integer $x_1^{(3)}$ and the strict partial order $\prec_{31}$ is given by the standard less-than relation $<$ for positive integers.

In the particular embodiment, the Evaluator is comprised of the following components:

The service level evaluator determines the level of stock. Among all ranges, above a realistic threshold and associated volume, the evaluator computes for each (range, volume) pair the aggregated deviation over the range. If the aggregated deviation shows that D more volume is needed, the relative shortening of the range that is needed to meet the demand is estimated and a penalty is determined, based on the degree of flexibility of the regular services. The total measure for the service level evaluator is given by the sum over all ranges above the threshold over the relative shortenings of the ranges needed multiplied by the respective penalty.

The service trigger evaluator identifies good and bad service trigger decisions based on the current candidate calibration. For each two service options a test is performed, based on the forecast and buffer factors, whether the minimum stockout levels suffice until the second next service, for each denomination belonging to the parameter the sub-set of denominations. Each possible decision where the stockout levels do not suffice is counted as a mistake. The total measure for the service trigger evaluation is given by the number of mistakes divided by the total number of decisions, weighted by a stockout penalty.

The cost evaluator determines for each candidate calibration the relative growth tendency of the resulting plan costs without the need to compute a plan beforehand. Underlying the method is a stochastic economic order quantity model for the demand, with stationary probability distribution and stochastically independent withdrawals and deposits. The expected value of the plan costs is defined via the economic order quantity model as a sum of the expected service costs, the expected interest costs and the expected penalty costs.

The gradient of the expected plan costs is the 2-vector consisting of the derivative with respect to order time as the first component and the derivative with respect to quantity of the expected plan costs as the second component. The cost tendency of a given candidate calibration is defined as the overall minimal deviations from the negative gradient in the search tree of possible ranges. The cost score of given candidate calibration is therefore defined as the average of all the distances in the direction of the negative gradient of the expected value of the costs in the search tree of possible service ranges.

The total evaluation score of a given candidate calibration is described, via a pre-defined weight factor w that is a real number in the closed unit interval and that encapsulates the willingness to take risks, as w multiplied by the sum of the service trigger evaluator and the service level evaluator plus (1−w) multiplied by the cost evaluator.

Functional Data Structures Used in the Autocalibration

FIG. 7 is a call diagram illustrating the interaction of the routines/data structures comprising a genetic metaheuristic according to one example of the present disclosure:

Mutator: The interface provides the basic functionality for mutation of candidate solutions. Selector: Provides the functionality for the selection operations.

CrossoverMethod: Provides the functionality for the crossover combination of individuals. Gene: By a gene we mean a single parameter of the system. A gene encodes the minimal/maximal permissible value of the parameter, the default value (as set by the system) and the current value as it is used by the genetic algorithm.

GeneVector: By a vector of genes we encode several parameters belonging to a single functional category. Each vector consists of a list of genes, encoded in the data structure List<Gene>. The routine getVectors(Parameters) returns the entire laminated candidate solution space.

EvalFitness: The main routine of this class is compute-Cost where the overall cost of a candidate solution is computed, based on the response of the evaluator engine.

RankSelector: Provides the functionality for the selection of individuals using probability ranking.

CombCrossover: This class provides the functionality for the combination of individual solutions. In the main routine of this class categories are interchanges according to a probability threshold.

NN: This interface furnishes the structure of the neural network. The network is initialized and continuously updated with the information contained in a list of GeneVectors, i.e. each vector of genes corresponds to the information processed by a single hidden layer of the network. The layers are stored in a list of NLayer type. The number of layers equals the number of functional categories of parameters.

Neuron: A neuron is managed within this class. The constructor depends on nw, i.e. the number of weights. The class contains methods to store and update neuron values. All weights are stored in a list of double values.

NLayer: This class manage a neuronal layer. It is constructed with n standing for the number of neurons in the layer and wpn, i.e. the weights per neuron.

NNProcessor: This is the main class for the processing of the supervised feedforward network.

This is meant as an illustration of one particular embodiment of an autocalibration mechanism. The mathematical description corresponds to specific functional data structures in this particular embodiment. These data structures are listed in FIG. 8 with their basic functionality. The parameters are subdivided into categories according to their function or role within the mathematical optimization. The functional categories, referred to as lamina above, are represented by instances of classes which process the parameters contained in each functional category.

The data structure facilitating this functionality is given by a list of GeneVectors. After instance creation of the functional classes, representing the categories of parameters, the constraint system modifies the gene vectors with their minimum and maximum values. The functional data structures determining the operation of the genetic algorithm consist of classes encoding an Individual with its genotype and phenotype and various classes ensuring the correct operation and performance of the algorithm. A genotype is encoded via the class GeneVector, consisting of a list vector of Genes. The genes encode parameters in terms of key/value pairs. Here, in the definition of the map $f_j$, the value 0 is mapped to the default state of the parameter, $\frac{1}{2}$ are mapped respectively to the minimum/maximum value (determined by the constraint system) and 3 to the current value. On the other hand, the phenotype consists of all the parameter keys and values that are translated from the genotype. In the concrete implementation we have to keep track of the precise location of each parameter in the memory of the devices and process these locations in a uniform way. The parameters are therefore identified by their parameter keys which are stored and used uniformly in the genotype, as well as the phenotype data structures. An individual is determined by a functional data structure encoding both the genotype and phenotype, as well as a means for translating the former into the latter.

The operations of the genetic algorithm are given as follows. The mutation generates a random value $\alpha$ in the interval $(0,1)$. If $\alpha < P_c$, then a parameter from the population of N individuals is selected at random. The recombination operation combines different gene vectors, i.e. categories of parameters, selected according to a probability threshold $\alpha < P_c$ from the population of N individuals.

The fitness function $f$ is defined as follows: given $g \in G$ as a candidate solution (genotype), we convert g via the transformation map T into a phenotype $x \in X \subset R^{\sum_{j=1}^d n(j)}$ which represents a candidate solution. Then $f(x)$ is defined as the sum of the service costs, the processing costs, the interest costs, the costs of keeping cash in stock (so-called stock-costs, resulting from the insurance of the cash) and the penalty costs (arising whenever the cashpoint runs out of cash prematurely).

The constraint system (CS) 54 encodes the semantic interdependencies of the parameters within their respective functional categories using various heuristics. This is specific to the concrete types and categories of parameters under consideration. In our case the CS 54 determines the upper and lower bounds for parameters, corresponding to the states MIN and MAX in the definition of the genotype. The CS ensures that the candidate solutions determined by the evolutionary algorithm stay within these bounds. After the constrained mutation and recombination operations have been executed on the population of individuals, the selection operations are executed. These are as described before. The algorithm repeats this process until the termination criterion is reached. The latter is defined as convergence, i.e. the offspring remain in the same fitness class of solutions.

To illustrate the functioning of the genetic algorithm in terms of the concrete example, where we restrict ourselves to the lamina of representations of parameters Service Trigger $L_1$ and Service Interval $L_3$ and the execution is limited to N=2 generations in order to preserve readability.

Breeding N=2 individuals that are represented by the vectors $x^{(1)}[a]$ and $x^{(3)}[a]$, where a=1,2 are the generations and $x^{(1)}$ consisting of the representations of the parameters sub-set of denominations, minimum stockout levels in their respective states DEFAULT 0, MIN 1, MAX 2 and CURRENT 3 as well as $x^{(3)}$ consisting of the representation of the parameter maximum service interval in its respective states. The set of all denominations is given by D={1, 10, 50, 100, 1000}. The first two generations are bred at random, verifying the bounds of the constraint system, yielding the genotypes:

$$x^{(1)}[1] = \begin{pmatrix} 0:\{50, 100\} & 0:50 \to 300, 100 \to 500 \\ 1:\emptyset & 1:50 \to 100, 100 \to 200, 10 \to 100 \\ 2:\{100, 50, 10\} & 2:50 \to 500, 100 \to 1000, 10 \to 300 \\ 3:\{50\} & 3:50 \to 250 \end{pmatrix},$$

$$x^{(1)}[2] = \begin{pmatrix} 0:\{50, 100\} & 0:50 \to 300, 100 \to 500 \\ 1:\emptyset & 1:10 \to 100, 50 \to 100, 100 \to 200 \\ 2:\{100, 50, 10\} & 2:50 \to 500, 100 \to 1000, 10 \to 300 \\ 3:\{10, 50\} & 3:10 \to 200, 50 \to 270 \end{pmatrix}$$

$$x^{(3)}[1] = \begin{pmatrix} 0:12 \\ 1:2 \\ 2:8 \\ 3:4 \end{pmatrix}, x^{(3)}[2] = \begin{pmatrix} 0:12 \\ 1:2 \\ 2:8 \\ 3:6 \end{pmatrix}$$

Selection: No difference in fitness of the two candidate solutions.

Mutation:

$$x^{(1)}[1] = \begin{pmatrix} 0:\{50, 100\} & 0:50 \to 300, 100 \to 500 \\ 1:\emptyset & 1:50 \to 100, 100 \to 200, 10 \to 100 \\ 2:\{100, 50, 10\} & 2:50 \to 500, 100 \to 1000, 10 \to 300 \\ 3:\{50\} & 3:50 \to 230 \end{pmatrix},$$

$$x^{(1)}[2] = \begin{pmatrix} 0:\{50, 100\} & 0:50 \to 300, 100 \to 500 \\ 1:\emptyset & 1:10 \to 100, 50 \to 100, 100 \to 200 \\ 2:\{100, 50, 10\} & 2:50 \to 500, 100 \to 1000, 10 \to 300 \\ 3:\{10, 50\} & 3:10 \to 220, 50 \to 290 \end{pmatrix}$$

$$x^{(3)}[1] = \begin{pmatrix} 0:12 \\ 1:2 \\ 2:8 \\ 3:5 \end{pmatrix}, x^{(3)}[2] = \begin{pmatrix} 0:12 \\ 1:2 \\ 2:8 \\ 3:7 \end{pmatrix}$$

Crossover:

$$x^{(1)}[1] = \begin{pmatrix} 0:\{50, 100\} & 0:50 \to 300, 100 \to 500 \\ 1:\emptyset & 1:50 \to 100, 100 \to 200, 10 \to 100 \\ 2:\{100, 50, 10\} & 2:50 \to 500, 100 \to 1000, 10 \to 300 \\ 3:\{50\} & 3:50 \to 230 \end{pmatrix},$$

-continued $$x^{(1)}[2] = \begin{pmatrix} 0:\{50, 100\} & 0:50 \to 300, 100 \to 500 \\ 1:\emptyset & 1:10 \to 100, 50 \to 100, 100 \to 200 \\ 2:\{100, 50, 10\} & 2:50 \to 500, 100 \to 1000, 10 \to 300 \\ 3:\{10, 50\} & 3:10 \to 220, 50 \to 290 \end{pmatrix},$$

$$x^{(1)}[3] = \begin{pmatrix} 0:\{50, 100\} & 0:50 \to 300, 100 \to 500 \\ 1:\emptyset & 1:50 \to 100, 100 \to 200, 10 \to 100 \\ 2:\{100, 50, 10\} & 50 \to 500, 100 \to 1000, 10 \to 300 \\ 3:\{50\} & 3:50 \to 290 \end{pmatrix},$$

$$x^{(1)}[4] = \begin{pmatrix} 0:\{50, 100\} & 0:50 \to 300, 100 \to 500 \\ 1:\emptyset & 1:10 \to 100, 50 \to 100, 100 \to 200 \\ 2:\{100, 50, 10\} & 2:50 \to 500, 100 \to 1000, 10 \to 300 \\ 3:\{10, 50\} & 3:10 \to 220, 50 \to 230 \end{pmatrix}$$

Selection: After probability ranking, the solution ($x^{(1)}[4]$, $x^{(3)}[1]$) is selected as the fittest solution, according to the quality score of the evaluator engine.

Feedforward Neural Network

FIG. 8 shows an example embodiment of a neural network and FIG. 9 is a call diagram which illustrates a possible interaction between the evolutionary metaheuristic routines and the functional data structures underlying a neural network. We go on to describe this example embodiment of an autocalibration mechanism, comprising a combination of evolutionary metaheuristic and feedforward neural network. Although the auto calibrator with an underlying evolutionary metaheuristic, as described above, performs well in obtaining a cost-minimal calibration, it can be relevant for some use-cases to couple it to a feedforward neural network.

The neural network architecture is in principle independent of the evolutionary algorithm and could be realized in a separate computer system, based on a distributed systems approach, i.e. similar to the arrangement in FIG. 11 with the addition of the neural network, interacting with the auto calibrator system. The supervised neural network comprises the following components. A feedforward neural network (cf. FIG. 8), i.e. a fully connected, directed and acyclic graph (excluding the possibility of recurrency in this particular embodiment). A neuron is a node, endowed with input and connection weights. By a weight we mean a normalized number in $[-1,1]$. A layer of the neural network is a group of neurons, each layer being endowed with an activation function, to be specified. There is an input layer, an output layer, as well as d (hidden) layers. Each neuron in layer i is connected to all neurons of layer i+1 for each $1 \le i \le d$. The learning rule of the network consists of the genetic algorithm, such that the genotype of a candidate solution corresponds to the network of hidden layers. The overall error the network produces corresponds to the negative of the fitness function of the genetic algorithm, i.e. the neural network with the lowest training error corresponds to the solution with the best fitness. Phenomenologically, weights of connections to the next layer correspond to parameter values. Denote by $L_i$ for $1 \le i \le d$ the hidden layers of the network. We denote by $x_{i,j}$ the j-th neuron in layer i and by $w_{i,j}$ the j-th weight of layer i. There are n(i) neurons/weights in/of layer i−1 for $1 \le i \le d$. We define n(0) to be the overall number of parameters in the system. The output layer contains n(0) neurons, i.e. the number of parameters of the entire calibration of the device. The input of layer i+1 is given by the weights of layer i as well as the activation levels of the previous layer and the output by the activation function applied to the input with an added bias:

$$\text{Input:}(w_{k;i})_{1 \le k \le n(i)}, (\mathcal{L}(x_{i-1,k}))_{1 \le k \le n(i-1})$$

$$\text{Output: } \mathcal{L}(\text{input}(s)) + \text{bias.}$$

The bias represents the knowledge base of the network. In our case this is the default value for each neuron, i.e. the default set for each parameter value. Therefore the activation function takes on the general form:

$$\mathcal{L}(x_{i,j}) = \varphi\left( \sum_{k=1}^{n(i-1)} \underbrace{\lambda_{i-1,k}}_{=\mathcal{L}(x_{i-1,k}} w_{i-1,k} + \sum_{k=1}^{n(i-1)} \underbrace{g_{k,i-1}(0)}_{=bias(x_{i-1,k})=default\ values} \right), 1 \le i \le d.$$

Here the function on the right hand side is a suitable nonlinear function. In some embodiments we could use the sigmoid function in the form of the logistic function $$\varphi(x) = \frac{e^x}{e^x + 1}.$$

Various other choices of nonlinear functions for activation are possible. Note that in alternate embodiments of the search mechanism, by means of other types of neural network, the learning rule changes accordingly.

The supervised neural network, cf. FIG. 8, is combined with the genetic algorithm in the following way in one embodiment, cf. FIG. 9:

At the beginning the cashpoint data (history, forecast and current cash level) 91 is passed on to the neural network processor 92. The number of input, output and hidden layers 93 is initialized, based on that information. Next the weights of the neurons 94 in the input, output and hidden layers are initialized.

The output for each neuron 94 in the output layer 93 is computed.

Call the genetic algorithm routines 95 and update the parameters of the neural network 92.

Check if the convergence criterion of the genetic algorithm is fulfilled.

If YES execute step 2 and finish.

If NO go to step 3.

In summary, certain aspects of the present disclosure provides a method to optimize, using a so-called auto-calibrator, a calibration for an optimizer of cash levels of a cashpoint (i.e. a cash device), by automating the calibration of parameters that are needed by the optimizer. The optimizer may rely on certain components of data: a forecast, the current cash levels of the device and/or a calibration. The cash device may store the historical turnover data and/or the current cash levels. The forecast may rely on the historical turnover data to generate, e.g. via a standard statistical procedure, the likely future turnover data of the machine. The calibration may comprise a set of parameters needed to fine tune the optimizer. The optimizer may execute methods of mathematical optimization in order to produce a plan for future cash level adjustments of the machine. Certain aspects of the innovation provide for the automation of the calibration, i.e. the automated determination of parameters, best suitable for ideal performance of the optimizer. In addition, aspects of the disclosure may provide a closed loop scheme for automated cash level adjustments of a cash point, without the need for human intervention.

FIG. 12 illustrates a feedback loop which enables a reactive and continuous calibration of parameters in accordance with an embodiment of the disclosure. In a high-level description, the process illustrated in FIG. 12 is performed by a calibrator system 123 in response to current information repeatedly provided by an evaluator system 121 and in addition the information provided by the forecaster system 124, communicated via a communication device 122. We go on to describe these communicating elements in sufficient detail as they relate to particular embodiments.

In at least one example, the present disclosure can be described as follows:

1. A method to calibrate the parameter search space of an underlying optimization device employing a functional lamination of the search space, comprising:

A constraint system comprising:

A subdivision of the parameter search space into functional categories.

The definition of logical constraints, i.e. the interrelationships of parameters.

A heuristic language encoding the functional semantics of the calibration search space.

A metaheuristic search comprising:

A functional data structure for internal representation of the constrained search space.

Search operations with components that interact with the constraint system.

A feedback mechanism that allows components of the auto calibrator to interact with the evaluator, comprising:

An internal memory, storing previous calibrations, in the form of a neural network.

An interface connecting the search operations of the auto calibrator system with the evaluation dataset generator of the evaluator system.

A concurrent internal arrangement of process execution, allowing feedback loop between the evaluator system and the auto calibrator system.

A convergence or stopping criterion to discontinue the feedback loop when a cost optimal calibration has been obtained.

2. A complex system to furnish fully automated cash level adjustments needed for the cost minimal operation of ATM's and cash recyclers, comprising:

A cashpoint, i.e. cash device, equipped with a secure network connection (a radio chip) and a memory chip.

Forecaster, Optimizer, Evaluator and Autocalibrator systems.

Transmittal of cash level and historic information from a cashpoint (i.e. a cash device), via a secure network.

Further passing on this information to a forecaster system and autocalibration system.

Passing on this information to the evaluator system with a feedback interaction mechanism.

Generating a plan based on the calibration by the optimizer system and transmitting the plan for cash level adjustments back to the cashpoint.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for determining, means for performing, means for transmitting, means for receiving, means for sending, means for signaling, means for selecting, means for correlating, means for evaluating, means for assigning, means for allocating, means for removing, means for summing, means for scaling, means calculating, means for averaging, and/or means for taking action, may include one or more processors, transmitters, receivers, and/or other elements of the components illustrated in the figures.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

While this disclosure has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

We claim:

1. A system for optimization comprising:
at least one cashpoint node in communication with at least one server node through a computer network, each of the at least one cashpoint node distributing cash from a respective stored cash level to respective authorized users;
wherein each of the at least one server node is operated by or on behalf of a banking institution, retail location, cash center, or cash-in-transit company;
at least one computing device node in communication with the at least one server node through the computer network;
wherein the at least one computing device node executes a forecasting engine configured to create a forecast dataset of a set of expected cash distributing transactions by respective users with each of the at least one cashpoint nodes in communication with the at least one server node;
wherein the forecasting engine utilizes historical and current cash level data from each cashpoint node to generate the forecast dataset for each respective cashpoint node;
wherein, as part of a feedback loop, the at least one computing device node executes a calibration engine that, in part based on the forecast dataset, is configured to create a number of candidate calibration datasets corresponding to each of the at least one cashpoint node;
wherein the calibration engine utilizes a genetic algorithm to generate the candidate calibration datasets;
wherein the genetic algorithm comprises a plurality of parameters as part of its analysis;
wherein the at least one computing device node executes an evaluator engine configured to evaluate the quality of calibration datasets and provide an evaluation dataset corresponding to each of the at least one cashpoint node;

wherein, as a finalization of a feedback loop, the at least one computing device node executes a calibration engine to create an optimized calibration dataset, for each cashpoint node of the at least one cashpoint node, selected from the candidate calibration datasets based on the evaluation dataset of the candidate calibration datasets;

wherein the at least one computing device node executes an optimizer engine configured to use the optimized calibration dataset to generate a plan dataset corresponding to each of the at least one cashpoint node that is provided to the at least one server node for execution and increased processing efficiency;

and wherein the at least one server node or the at least one cashpoint node sends a service order based on a respective plan dataset, and the order triggers a servicing of the corresponding at least one cashpoint node in accordance with a respective plan dataset.

2. The system of claim 1, wherein the feedback loop includes the evaluator engine feeding the calibration engine that, when reaching the termination of the feedback loop, provides the optimized calibration dataset, for each respective cashpoint node, to the optimizer engine for further processing.

3. The system of claim 1, wherein the calibration engine and the evaluator engine iteratively process datasets to generate the optimized calibration dataset for each respective at least one cashpoint node.

4. The system of claim 1, wherein each of the at least one cashpoint node receives the respective plan dataset via the computer network.

5. The system of claim 1, wherein the plurality of parameters for each respective cashpoint node can be chosen from a set of cash denominations, a stock level threshold, a buffer factor, and a minimum balance for each of the at least one cashpoint node.

6. The system of claim 5, wherein the genetic algorithm performs mutation, combination, and selection operations based on each of the plurality of parameters to generate each of the candidate calibration datasets.

7. A method of optimization comprising:

communicating historical and current cash level data from at least one cashpoint node to at least one computing device node in communication with at least one server node through a computer network; wherein each of the at least one cashpoint nodes is capable of distributing cash from a respective stored cash level to respective authorized users, wherein each of the at least one server nodes is operated by or on behalf of a banking institution, retail location, cash center, or cash-in-transit company;

executing a forecasting engine by the at least one computing device node, wherein the forecasting engine is configured to create a forecast dataset comprising a set of expected cash distributing transactions by respective users with each of the at least one cashpoint nodes in communication with at least one server node; wherein the forecasting engine utilizes historical and current cash level data from each cashpoint node to generate the forecast dataset for each respective cashpoint node;

executing a calibration engine by the at least one computing device node, wherein, the calibration engine executes a feedback loop to create a number of candidate calibration datasets corresponding to each of the at least one cashpoint nodes in part based on the forecast dataset, wherein the calibration engine utilizes a genetic algorithm to generate the candidate calibration datasets, and wherein the genetic algorithm comprises a plurality of parameters as part of its analysis;

executing an evaluator engine by the at least one computing device node, wherein the evaluator engine evaluates the quality of calibration datasets and provides an evaluation dataset corresponding to each of the at least one cashpoint nodes;

finalizing the feedback loop by the at least one computing device node and creating an optimized calibration dataset by the calibration engine selected from the candidate calibration datasets based on the evaluation dataset of the candidate calibration datasets for each cashpoint node of the at least one cashpoint node;

executing an optimizer engine by the at least one computing device node, wherein the optimizer engine is configured to use the optimized calibration dataset to generate a plan dataset corresponding to each of the at least one cashpoint node;

providing the optimized calibration dataset to the at least one server node for execution;

sending a service order based on a respective plan dataset by the at least one server node or the at least one cashpoint node, wherein the order triggers a servicing of the corresponding at least one cashpoint node in accordance with a respective plan dataset.

8. The method of claim 7, wherein the step of executing a feedback loop by the calibration engine includes the evaluator engine feeding the calibration engine that, when reaching the termination of the feedback loop, provides the optimized calibration dataset, for each respective cashpoint node, to the optimizer engine for further processing.

9. The system of claim 7, wherein the step of generating the optimized calibration dataset for each respective at least one cashpoint node comprises the calibration engine and the evaluator engine iteratively processing datasets.

10. The system of claim 7, wherein the step of sending a service order also comprises each of the at least one cashpoint node receiving the respective plan dataset via the computer network.

11. The system of claim 7, wherein the step of executing the feedback loop by the calibration engine using a genetic algorithm comprising a plurality of parameters also comprises choosing a parameter for each respective cashpoint node from the set of cash denominations, a stock level threshold, a buffer factor, and a minimum balance for each of the at least one cashpoint node.

12. The system of claim 7, wherein generation of the candidate calibration datasets by the genetic algorithm comprises mutation, combination, and selection operations based on each of the plurality of parameters.

* * * * *